US010992943B2

(12) United States Patent
Handford

(10) Patent No.: US 10,992,943 B2
(45) Date of Patent: Apr. 27, 2021

(54) DATA PROCESSING APPARATUSES, METHODS, COMPUTER PROGRAMS AND COMPUTER-READABLE MEDIA

(71) Applicant: V-NOVA INTERNATIONAL LTD, London (GB)

(72) Inventor: David Handford, London (GB)

(73) Assignee: V-NOVA INTERNATIONAL LIMITED, London (GB)

(*) Notice: Subject to any disclaimer, the term of this patent is extended or adjusted under 35 U.S.C. 154(b) by 131 days.

(21) Appl. No.: 16/295,847

(22) Filed: Mar. 7, 2019

(65) Prior Publication Data

US 2019/0313109 A1  Oct. 10, 2019

Related U.S. Application Data

(63) Continuation of application No. PCT/GB2017/052631, filed on Sep. 8, 2017.

(30) Foreign Application Priority Data

Sep. 8, 2016 (GB) ...................... 1615265

(51) Int. Cl.
*H04N 19/187* (2014.01)
*H04N 19/31* (2014.01)
(Continued)

(52) U.S. Cl.
CPC .......... *H04N 19/187* (2014.11); *H04N 19/30* (2014.11); *H04N 19/31* (2014.11); *H04N 19/33* (2014.11); *H04N 19/503* (2014.11)

(58) Field of Classification Search
CPC ...... H04N 19/187; H04N 19/30; H04N 19/31; H04N 19/33; H04N 19/503
See application file for complete search history.

(56) References Cited

U.S. PATENT DOCUMENTS

| 2005/0157794 A1 | 7/2005 | Kim et al. |
| 2009/0232198 A1 | 9/2009 | Cho et al. |

(Continued)

FOREIGN PATENT DOCUMENTS

| WO | 2009-130540 | 10/2009 |
| WO | 2013011493 A2 | 1/2013 |
| WO | 2013171173 A1 | 11/2013 |

OTHER PUBLICATIONS

Uslubas, Serhan, Ehsan Maani, and Aggelos K. Katsaggelos. "A resolution adaptive video compression system." Intelligent Multimedia Communication: Techniques and Applications. Springer, Berlin, Heidelberg, 2010. 167-194. (Year: 2010).*

(Continued)

*Primary Examiner* — Nirav G Patel
(74) *Attorney, Agent, or Firm* — Workman Nydegger; Shane K. Jensen

(57) ABSTRACT

A set of residual elements useable to reconstruct a rendition of a first time sample of a signal is obtained. A set of spatio-temporal correlation elements associated with the first time sample is generated. The set of spatio-temporal correlation elements is indicative of an extent of spatial correlation between a plurality of residual elements and an extent of temporal correlation between first reference data based on the rendition and second reference data based on a rendition of a second time sample of the signal. The set of spatio-temporal correlation elements is used to generate output data.

20 Claims, 12 Drawing Sheets

(51) Int. Cl.
  *H04N 19/33*    (2014.01)
  *H04N 19/503*   (2014.01)
  *H04N 19/30*    (2014.01)

(56) References Cited

U.S. PATENT DOCUMENTS

2015/0098510 A1   4/2015   Yan et al.
2015/0256828 A1   9/2015   Dong et al.

OTHER PUBLICATIONS

Dugad et al.: A Scheme for Spatial Scalability Using Nonscalable Encoders, IEEE Transactions on Circuits and Systems for Video Technology, vol. 13, No. 10, Oct. 2003.
Schwarz et al.: Overview of the Scalable Video Coding Extension of the H.264/avc Standard, IEEE Transactions on Circuits and Systems for Video Technology, vol. 17, No. 9, Sep. 2007.
International Search Report and Written Opinion dated Dec. 19, 2017 for PCT Application No. PCT/GB2017/052631.
UKIPO Search Report dated Feb. 22, 2017 for Application No. GB1615265.4.
Amendment to Search Report dated Feb. 27, 2017 for Application No. GB1615265.4.
European Examination Report for EP 17783955.2 dated Aug. 3, 2020.

\* cited by examiner

DATA PROCESSING APPARATUSES, METHODS, COMPUTER PROGRAMS AND COMPUTER-READABLE MEDIA

CROSS-REFERENCE TO RELATED APPLICATIONS

This application is a continuation of International Application No. PCT/GB2017/052631, filed Sep. 8, 2017, which claims priority to UK Application No. GB1615265.4, filed Sep. 8, 2016, under 35 U.S.C. § 119(a). Each of the above-referenced patent applications is incorporated by reference in its entirety.

BACKGROUND OF THE INVENTION

Technical Field

This invention relates to data processing apparatuses, methods, computer programs and computer-readable media.

Background

Compression and decompression of signals is a consideration in many known systems. Many types of signal, for example video, audio or volumetric signals, may be compressed and encoded for transmission, for example over a data communications network. Signals may also be stored in a compressed form, for example on a storage medium such as a Digital Versatile Disc (DVD). When such a signal is decoded, it may be desired to increase a level of quality of the signal and/or recover as much of the information contained in the original signal as possible.

Some known systems exploit scalable encoding techniques. Scalable encoding involves encoding a signal along with information to allow the reconstruction of the signal at one or more different levels of quality, for example depending on the capabilities of the decoder and the available bandwidth. However, relatively large amounts of information may still be stored and/or transmitted, particularly as the usage of higher quality, higher definition video becomes more widespread.

SUMMARY

According to a first aspect of the present invention, there is provided an apparatus configured to: obtain a set of residual elements, the set of residual elements being useable to reconstruct a first rendition of a first time sample of a signal at a relatively high level of quality in a tiered hierarchy having multiple levels of quality using a second rendition of the first time sample of the signal at the relatively high level of quality, the second rendition being based on a rendition of the first time sample of the signal at a relatively low level of quality in the tiered hierarchy; generate a set of spatio-temporal correlation elements associated with the first time sample of the signal, the set of spatio-temporal correlation elements being indicative of an extent of spatial correlation between a plurality of residual elements in the set of residual elements and an extent of temporal correlation between first reference data based on the first rendition and second reference data based on a rendition of a second time sample of the signal; use the set of spatio-temporal correlation elements to generate first output data; and use the rendition at the relatively low level of quality to generate second output data.

According to a second aspect of the present invention, there is provided an apparatus configured to: receive input data comprising first input data based on a set of spatio-temporal correlation elements and second input data based on a rendition of a first time sample of a signal at a relatively low level of quality in a tiered hierarchy having multiple levels of quality; obtain a set of residual elements using the set of spatio-temporal correlation elements, the set of residual elements being useable to reconstruct a first rendition of the first time sample of the signal at a relatively high level of quality in the tiered hierarchy using a second rendition of the first time sample of the signal at the relatively high level of quality, the second rendition being based on the rendition at the relatively low level of quality; and reconstruct the first rendition at the relatively high level of quality using the second rendition and the set of residual elements, wherein the set of spatio-temporal correlation elements are indicative of an extent of spatial correlation between a plurality of residual elements in the set of residual elements and an extent of temporal correlation between first reference data based on the first rendition and second reference data based on a rendition of a second time sample of the signal.

According to a third aspect of the present invention, there is provided a method comprising: obtaining a set of residual elements, the set of residual elements being useable to reconstruct a first rendition of a first time sample of a signal at a relatively high level of quality in a tiered hierarchy having multiple levels of quality using a second rendition of the first time sample of the signal at the relatively high level of quality, the second rendition being based on a rendition of the first time sample of the signal at a relatively low level of quality in the tiered hierarchy; generating a set of spatio-temporal correlation elements associated with the first time sample of the signal, the set of spatio-temporal correlation elements being indicative of an extent of spatial correlation between a plurality of residual elements in the set of residual elements and an extent of temporal correlation between first reference data based on the first rendition and second reference data based on a rendition of a second time sample of the signal; using the set of spatio-temporal correlation elements to generate first output data; and using the rendition at the relatively low level of quality to generate second output data.

According to a fourth aspect of the present invention, there is provided a computer program comprising instructions which, when executed, cause an apparatus to perform a method comprising: obtaining a set of residual elements, the set of residual elements being useable to reconstruct a first rendition of a first time sample of a signal at a relatively high level of quality in a tiered hierarchy having multiple levels of quality using a second rendition of the first time sample of the signal at the relatively high level of quality, the second rendition being based on a rendition of the first time sample of the signal at a relatively low level of quality in the tiered hierarchy; generating a set of spatio-temporal correlation elements associated with the first time sample of the signal, the set of spatio-temporal correlation elements being indicative of an extent of spatial correlation between a plurality of residual elements in the set of residual elements and an extent of temporal correlation between first reference data based on the first rendition and second reference data based on a rendition of a second time sample of the signal; using the set of spatio-temporal correlation elements to generate first output data; and using the rendition at the relatively low level of quality to generate second output data.

According to a fifth aspect of the present invention, there is provided a computer-readable medium comprising a computer program comprising instructions which, when executed, cause an apparatus to perform a method comprising: obtaining a set of residual elements, the set of residual elements being useable to reconstruct a first rendition of a first time sample of a signal at a relatively high level of quality in a tiered hierarchy having multiple levels of quality using a second rendition of the first time sample of the signal at the relatively high level of quality, the second rendition being based on a rendition of the first time sample of the signal at a relatively low level of quality in the tiered hierarchy; generating a set of spatio-temporal correlation elements associated with the first time sample of the signal, the set of spatio-temporal correlation elements being indicative of an extent of spatial correlation between a plurality of residual elements in the set of residual elements and an extent of temporal correlation between first reference data based on the first rendition and second reference data based on a rendition of a second time sample of the signal; using the set of spatio-temporal correlation elements to generate first output data; and using the rendition at the relatively low level of quality to generate second output data.

According to a sixth aspect of the present invention, there is provided a method comprising: receiving input data comprising first input data based on a set of spatio-temporal correlation elements and second input data based on a rendition of a first time sample of a signal at a relatively low level of quality in a tiered hierarchy having multiple levels of quality; obtaining a set of residual elements using the set of spatio-temporal correlation elements, the set of residual elements being useable to reconstruct a first rendition of the first time sample of the signal at a relatively high level of quality in the tiered hierarchy using a second rendition of the first time sample of the signal at the relatively high level of quality, the second rendition being based on the rendition at the relatively low level of quality; and reconstructing the first rendition at the relatively high level of quality using the second rendition and the set of residual elements, wherein the set of spatio-temporal correlation elements are indicative of an extent of spatial correlation between a plurality of residual elements in the set of residual elements and an extent of temporal correlation between first reference data based on the first rendition and second reference data based on a rendition of a second time sample of the signal.

According to a seventh aspect of the present invention, there is provided a computer program comprising instructions which, when executed, cause an apparatus to perform a method comprising: receiving input data comprising first input data based on a set of spatio-temporal correlation elements and second input data based on a rendition of a first time sample of a signal at a relatively low level of quality in a tiered hierarchy having multiple levels of quality; obtaining a set of residual elements using the set of spatio-temporal correlation elements, the set of residual elements being useable to reconstruct a first rendition of the first time sample of the signal at a relatively high level of quality in the tiered hierarchy using a second rendition of the first time sample of the signal at the relatively high level of quality, the second rendition being based on the rendition at the relatively low level of quality; and reconstructing the first rendition at the relatively high level of quality using the second rendition and the set of residual elements, wherein the set of spatio-temporal correlation elements are indicative of an extent of spatial correlation between a plurality of residual elements in the set of residual elements and an extent of temporal correlation between first reference data based on the first rendition and second reference data based on a rendition of a second time sample of the signal.

According to an eighth aspect of the present invention there is provided a computer-readable medium comprising a computer program comprising instructions which, when executed, cause an apparatus to perform a method comprising: receiving input data comprising first input data based on a set of spatio-temporal correlation elements and second input data based on a rendition of a first time sample of a signal at a relatively low level of quality in a tiered hierarchy having multiple levels of quality; obtaining a set of residual elements using the set of spatio-temporal correlation elements, the set of residual elements being useable to reconstruct a first rendition of the first time sample of the signal at a relatively high level of quality in the tiered hierarchy using a second rendition of the first time sample of the signal at the relatively high level of quality, the second rendition being based on the rendition at the relatively low level of quality; and reconstructing the first rendition at the relatively high level of quality using the second rendition and the set of residual elements, wherein the set of spatio-temporal correlation elements are indicative of an extent of spatial correlation between a plurality of residual elements in the set of residual elements and an extent of temporal correlation between first reference data based on the first rendition and second reference data based on a rendition of a second time sample of the signal.

According to a ninth aspect of the present invention, there is provided an apparatus configured to: receive input data comprising first input data based on a set of correlation elements and second input data based on a rendition of a first time sample of a signal at a relatively low level of quality in a tiered hierarchy having multiple levels of quality; obtain a set of residual elements using the set of correlation elements, the set of residual elements being useable to reconstruct a first rendition of the first time sample of the signal at a relatively high level of quality in the tiered hierarchy using a second rendition of the first time sample of the signal at the relatively high level of quality, the second rendition being based on the rendition at the relatively low level of quality; and reconstruct the first rendition at the relatively high level of quality using the second rendition and the set of residual elements, wherein the set of correlation elements is indicative of at least an extent of spatial correlation between a plurality of residual elements in the set of residual elements, and wherein the input data includes data identifying whether the set of correlation elements is indicative of the extent of spatial correlation or whether the set of correlation elements is further indicative of an extent of temporal correlation between first reference data based on the first rendition and second reference data based on a rendition of a second time sample of the signal.

According to a tenth aspect of the present invention, there is provided a method comprising: receiving input data comprising first input data based on a set of correlation elements and second input data based on a rendition of a first time sample of a signal at a relatively low level of quality in a tiered hierarchy having multiple levels of quality; obtaining a set of residual elements using the set of correlation elements, the set of residual elements being useable to reconstruct a first rendition of the first time sample of the signal at a relatively high level of quality in the tiered hierarchy using a second rendition of the first time sample of the signal at the relatively high level of quality, the second rendition being based on the rendition at the relatively low level of quality; and reconstructing the first rendition at the relatively high level of quality using the second rendition and the set of residual elements, wherein the set of correlation elements is indicative of at least an extent of spatial correlation between a plurality of residual elements in the set of residual elements, and wherein the input data includes data identifying whether the set of correlation elements is indicative of the extent of spatial correlation or whether the set of correlation elements is further indicative of an extent of temporal correlation between first reference data based on the first rendition and second reference data based on a rendition of a second time sample of the signal.

According to an eleventh aspect of the present invention, there is provided a computer program comprising instructions which, when executed, cause an apparatus to perform a method comprising: receiving input data comprising first input data based on a set of correlation elements and second input data based on a rendition of a first time sample of a signal at a relatively low level of quality in a tiered hierarchy having multiple levels of quality; obtaining a set of residual elements using the set of correlation elements, the set of residual elements being useable to reconstruct a first rendition of the first time sample of the signal at a relatively high level of quality in the tiered hierarchy using a second rendition of the first time sample of the signal at the relatively high level of quality, the second rendition being based on the rendition at the relatively low level of quality; and reconstructing the first rendition at the relatively high level of quality using the second rendition and the set of residual elements, wherein the set of correlation elements is indicative of at least an extent of spatial correlation between a plurality of residual elements in the set of residual elements, and wherein the input data includes data identifying whether the set of correlation elements is indicative of the extent of spatial correlation or whether the set of correlation elements is further indicative of an extent of temporal correlation between first reference data based on the first rendition and second reference data based on a rendition of a second time sample of the signal.

According to a twelfth aspect of the present invention, there is provided a computer-readable medium comprising a computer program comprising instructions which, when executed, cause an apparatus to perform a method comprising: receiving input data comprising first input data based on a set of correlation elements and second input data based on a rendition of a first time sample of a signal at a relatively low level of quality in a tiered hierarchy having multiple levels of quality; obtaining a set of residual elements using the set of correlation elements, the set of residual elements being useable to reconstruct a first rendition of the first time sample of the signal at a relatively high level of quality in the tiered hierarchy using a second rendition of the first time sample of the signal at the relatively high level of quality, the second rendition being based on the rendition at the relatively low level of quality; and reconstructing the first rendition at the relatively high level of quality using the second rendition and the set of residual elements, wherein the set of correlation elements is indicative of at least an extent of spatial correlation between a plurality of residual elements in the set of residual elements, and wherein the input data includes data identifying whether the set of correlation elements is indicative of the extent of spatial correlation or whether the set of correlation elements is further indicative of an extent of temporal correlation between first reference data based on the first rendition and second reference data based on a rendition of a second time sample of the signal.

Further features and advantages will become apparent from the following description, given by way of example only, which is made with reference to the accompanying drawings.

DETAILED DESCRIPTION

Figure 1:
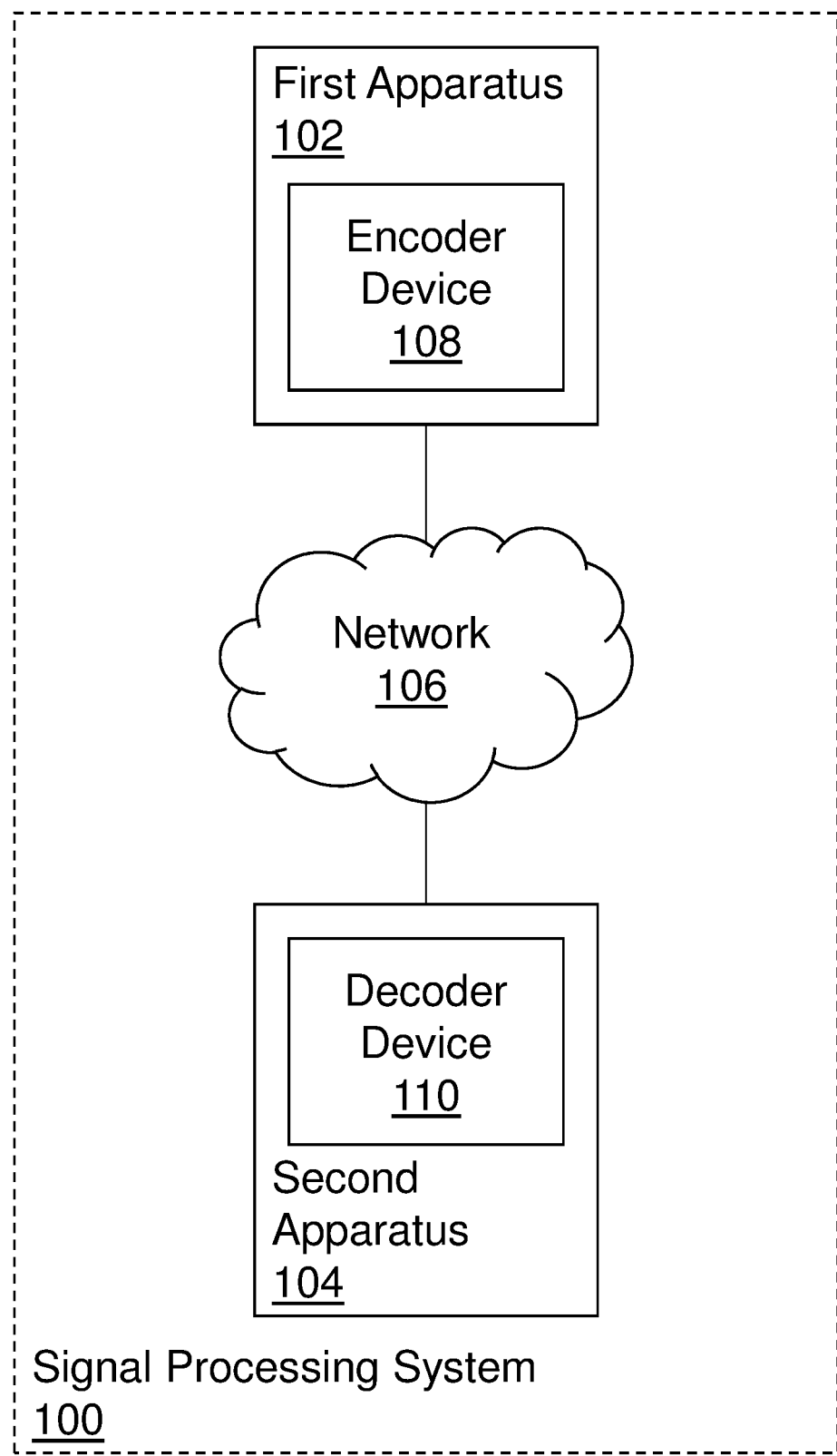
FIG. 1 shows a schematic block diagram of an example of a signal processing system in accordance with an embodiment of the present invention.

Referring to FIG. 1, there is shown an example of a signal processing system 100. The signal processing system 100 is used to process signals. Examples of types of signal include, but are not limited to, video signals, image signals, audio signals, volumetric signals such as those used in medical, scientific or holographic imaging, or other multidimensional signals.

The signal processing system 100 includes a first apparatus 102 and a second apparatus 104. The first apparatus 102 and second apparatus 104 may have a client-server relationship, with the first apparatus 102 performing the functions of a server device and the second apparatus 104 performing the functions of a client device. The signal processing system 100 may include at least one additional apparatus (not shown). The first apparatus 102 and/or second apparatus 104 may comprise one or more components. The components may be implemented in hardware and/or software. The one or more components may be co-located or may be located remotely from each other in the signal processing system 100. Examples of types of apparatus include, but are not limited to, computerised devices, routers, workstations, handheld or laptop computers, tablets, mobile devices, games consoles, smart televisions, set-top boxes, augmented and/or virtual reality headsets etc.

The first apparatus 102 is communicatively coupled to the second apparatus 104 via a data communications network 106. Examples of the data communications network 106 include, but are not limited to, the Internet, a Local Area Network (LAN) and a Wide Area Network (WAN). The first and/or second apparatus 102, 104 may have a wired and/or wireless connection to the data communications network 106.

The first apparatus 102 comprises an encoder device 108. The encoder device 108 is configured to encode data comprised in the signal, which is referred to hereinafter as "signal data". The encoder device 108 may perform one or more further functions in addition to encoding signal data. The encoder device 108 may be embodied in various different ways. For example, the encoder device 108 may be embodied in hardware and/or software.

The second apparatus 104 comprises a decoder device 110. The decoder device 110 is configured to decode signal data. The decoder device 110 may perform one or more further functions in addition to decoding signal data. The decoder device 110 may be embodied in various different ways. For example, the decoder device 110 may be embodied in hardware and/or software.

The encoder device 108 encodes signal data and transmits the encoded signal data to the decoder device 110 via the data communications network 106. The decoder device 110 decodes the received, encoded signal data and generates decoded signal data. The decoder device 110 may output the decoded signal data, or data derived using the decoded signal data. For example, the decoder device 110 may output such data for display on one or more display devices associated with the second apparatus 104.

In some examples described herein, the encoder device 108 transmits to the decoder device 110 a rendition of a signal at a given level of quality and information the decoder device 110 can use to reconstruct a rendition of the signal at one or more higher levels of quality. A rendition of a signal at a given level of quality may be considered to be a representation, version or depiction of data comprised in the signal at the given level of quality.

Compared to some known techniques, examples described herein allow a relatively small amount of information to be used for such reconstruction. This may reduce the amount of data transmitted via the data communications network 106. The savings may be particularly relevant where the signal data corresponds to high quality video data, where the amount of information transmitted in known systems can be especially high.

Figure 2A:
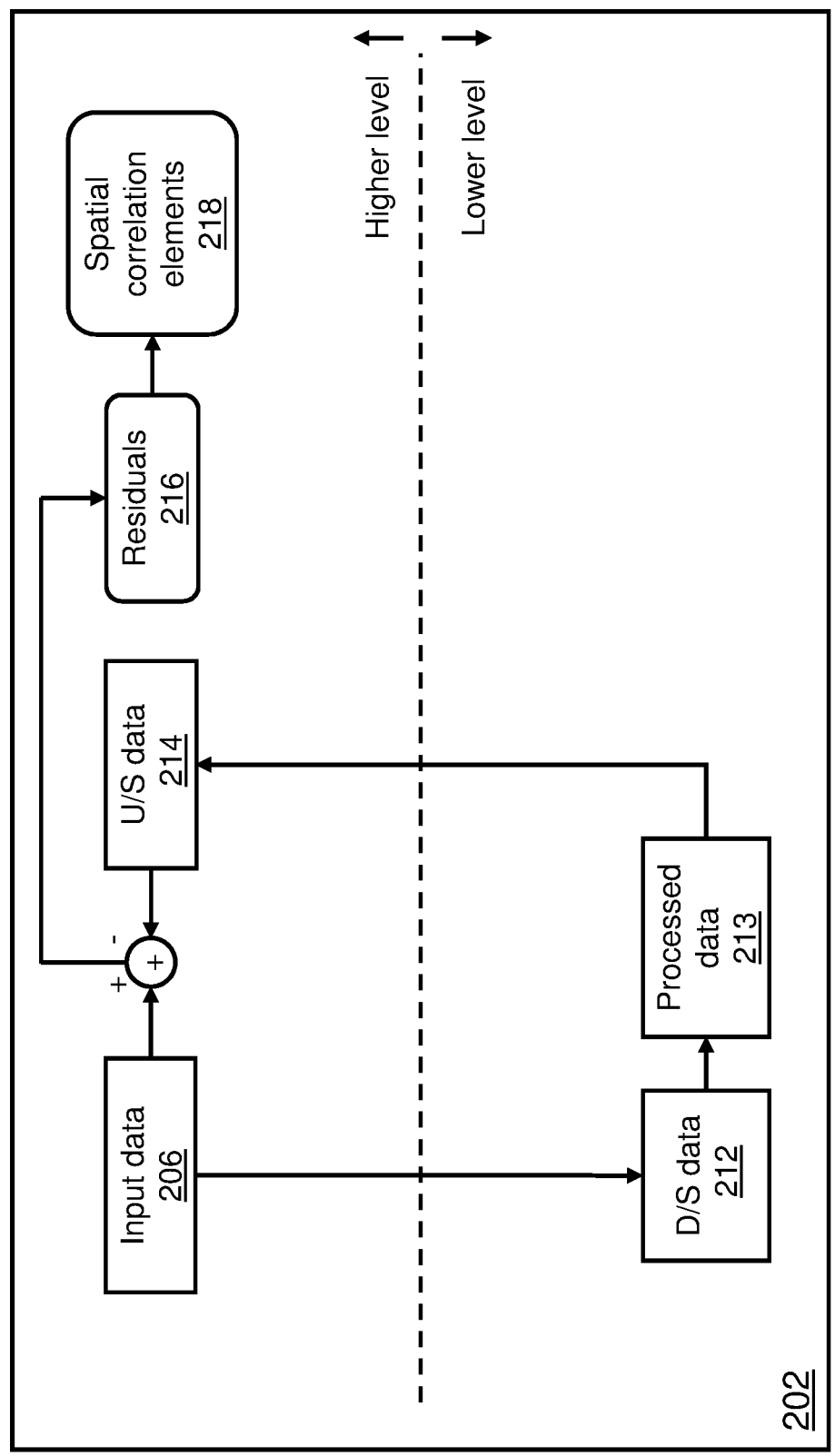
FIGS. 2A and 2B show a schematic block diagram of another example of a signal processing system in accordance with an embodiment of the present invention.
Figure 2B:
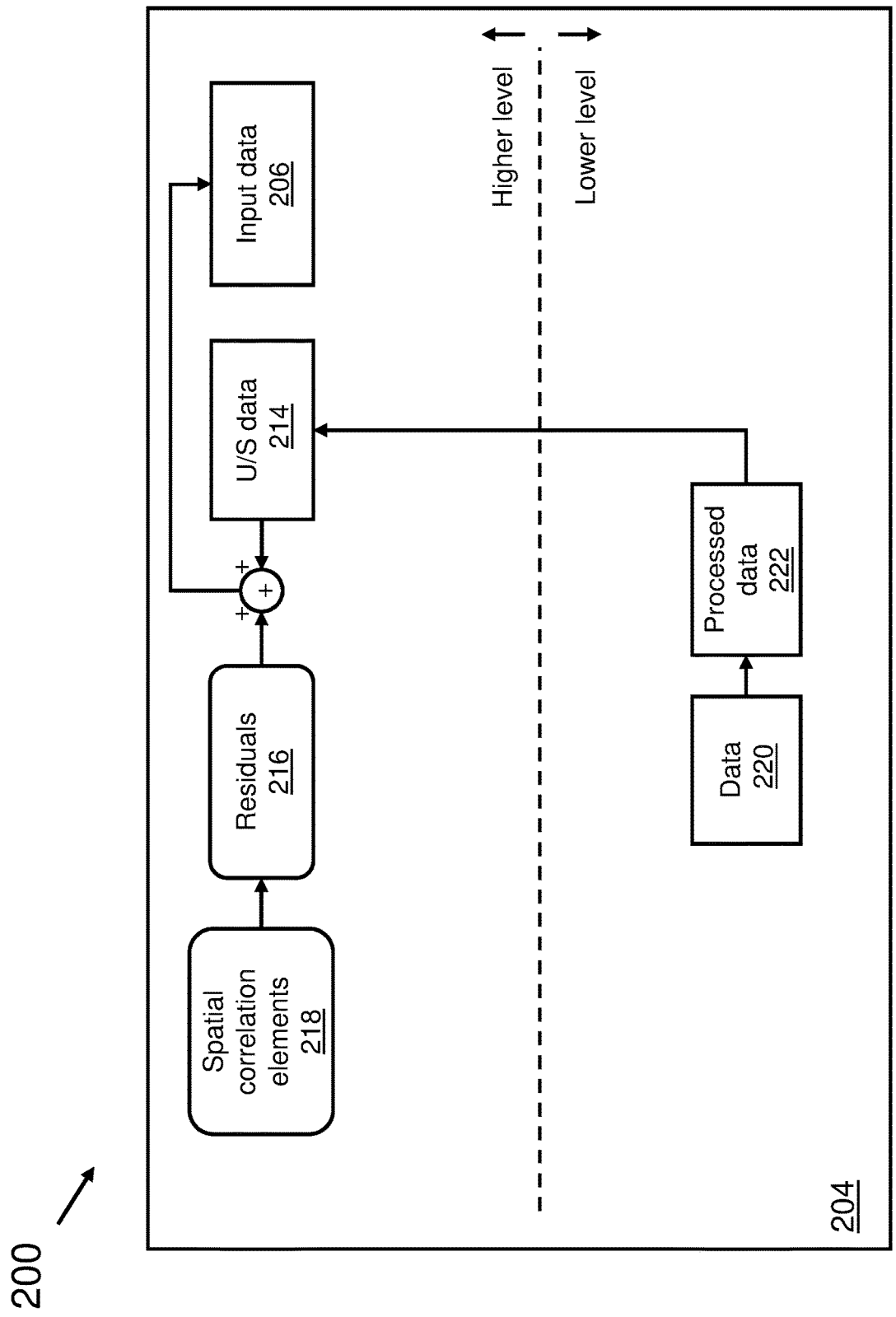

Referring to FIGS. 2A and 2B, there is shown schematically an example of a signal processing system 200. The signal processing system 200 includes a first apparatus 202 comprising an encoder device and a second apparatus 204 comprising a decoder device. In each of the first apparatus 202 and the second apparatus 204, items are shown on two logical levels. The two levels are separated by a dashed line. Items on the first, highest level relate to data at a relatively high level of quality. Items on the second, lowest level relate to data at a relatively low level of quality. The relatively high and relatively low levels of quality relate to a tiered hierarchy having multiple levels of quality. In some examples, the tiered hierarchy comprises more than two levels of quality. In such examples, the first apparatus 202 and the second apparatus 204 may include more than two different levels. There may be one or more other levels above and/or below those depicted in FIGS. 2A and 2B.

Referring first to FIG. 2A, the first apparatus 202 obtains a rendition of a first time sample, $t_1$, of a signal at a relatively high level of quality 206. A rendition of a given time sample of a signal is a representation of data comprised in the signal at a given point in time. The rendition of the first time sample, $t_1$, of the signal at the relatively high level of quality 206 will be referred to as "input data" hereinafter as, in this example, it is data provided as an input to the encoder device in the first apparatus 202. The first apparatus 202 may receive the input data 206. For example, the first apparatus 202 may receive the input data 206 from at least one other apparatus.

When the signal is a video signal, the first time sample of the signal may be all or part of an image or frame from a sequence of images or frames making up the video signal. The input data 206 may be arranged as an array of signal elements, $I_{ij}$, comprising one or more rows and columns of signal elements, where i denotes a row number associated with the signal element and j denotes a column number associated with the signal element. In this example, the input data 206 is arranged as an array comprising first and second rows of signal elements. The first row includes signal elements $I_{11}$ and $I_{12}$ and the second row includes signal elements $I_{21}$ and $I_{22}$. In this example, the input data 206 relates to part of an image. The part of the image may be referred to as a tile. The entire image may comprise many such tiles, and may consequently comprise many more than four signal elements. However, for convenience and brevity, in this example that the input data comprises just four signal elements.

The first apparatus 202 derives data 212 based on the input data 206. In this example, the data 212 based on the input data 206 is a preliminary representation 212 of the first time sample, $t_1$, of the signal at the relatively low level of quality. In this example, the data 212 is derived by performing a downsampling operation on the input data 206 and will therefore be referred to as "downsampled data" hereinafter. In other examples, the data 212 is derived by performing an operation other than a downsampling operation on the input data 206.

In this example, the downsampled data 212 is processed to generate processed data 213 at the relatively low level of quality. In other examples, the downsampled data 212 is not processed at the relatively low level of quality. As such, the first apparatus 202 may generate data at the relatively low level of quality, where the data at the relatively low level of quality comprises the downsampled data 212 or the processed data 213.

In some examples, generating the processed data 213 involves encoding the downsampled data 212. Encoding the downsampled data 212 produces an encoded signal at the relatively low level of quality. The first apparatus 202 may output the encoded signal, for example for transmission to the second apparatus 204. Instead of being produced in the first apparatus 202, the encoded signal may be produced by an encoding device that is separate from the first apparatus 202. The encoded signal may be an H.264 encoded signal. H.264 encoding can involve arranging a sequence of images into a Group of Pictures (GOP). Each image in the GOP is representative of a different time sample of the signal. A given image in the GOP may be encoded using one or more reference images associated with earlier and/or later time samples from the same GOP, in a process known as 'inter-frame prediction'.

Generating the processed data 213 at the relatively low level of quality may further involve decoding the encoded signal at the relatively low level of quality. The decoding operation may be performed to emulate a decoding operation at the second apparatus 204, as will become apparent below. Decoding the encoded signal produces a decoded signal at the relatively low level of quality. In some examples, the first apparatus 202 decodes the encoded signal at the relatively low level of quality to produce the decoded signal at the relatively low level of quality. In other examples, the first apparatus 202 receives the decoded signal at the relatively low level of quality, for example from an encoding and/or decoding device that is separate from the first apparatus 202. The encoded signal may be decoded using an H.264 decoder. H.264 decoding results in a sequence of images (that is, a sequence of time samples of the signal) at the relatively low level of quality. None of the individual images is indicative of a temporal correlation between different images in the sequence following the completion of the H.264 decoding process. Therefore, any exploitation of temporal correlation between sequential images that is employed by H.264 encoding is removed during H.264 decoding, as sequential images are decoupled from one another. The processing that follows is therefore performed on an image-by-image basis where the first apparatus 202 processes video signal data.

In an example, generating the processed data 213 at the relatively low level of quality further involves obtaining correction data based on a comparison between the downsampled data 212 and the decoded signal obtained by the first apparatus 202, for example based on the difference between the downsampled data 212 and the decoded signal. The correction data can be used to correct for errors introduced in encoding and decoding the downsampled data 212. In some examples, the first apparatus 202 outputs the correction data, for example for transmission to the second apparatus 204, as well as the encoded signal. This allows the recipient to correct for the errors introduced in encoding and decoding the downsampled data 212.

In some examples, generating the processed data 213 at the relatively low level of quality further involves correcting the decoded signal using the correction data. In other examples, rather than correcting the decoded signal using the correction data, the first apparatus 202 uses the downsampled data 212.

In some examples, generating the processed data 213 involves performing one or more operations other than the encoding, decoding, obtaining and correcting acts described above.

The first apparatus 202 obtains data 214 based on the data at the relatively low level of quality. As indicated above, the data at the relatively low level of quality may comprise the processed data 213, or the downsampled data 212 where the downsampled data 212 is not processed at the lower level. In this example, the data 214 is a second rendition of the first time sample of the signal at the relatively high level of quality, the first rendition of the first time sample of the signal at the relatively high level of quality being the input data 206. The second rendition at the relatively high level of quality may be considered to be a preliminary or predicted rendition of the first time sample of the signal at the relatively high level of quality. In this example, the first apparatus 202 derives the data 214 by performing an upsampling operation on the data at the relatively low level of quality. The data 214 will be referred to hereinafter as "upsampled data". However, in other examples one or more other operations could be used to derive the data 214, for example where data 212 is not derived by downsampling the input data 206.

Similar to the input data 206, the upsampled data 214 may be arranged as an array of signal elements, $U_{ij}$, comprising one or more rows and columns of signal elements, where i denotes a row number associated with the signal element and j denotes a column number associated with the signal element.

The input data 206 and the upsampled data 214 are used to obtain residual data 216. The residual data 216 is associated with the first time sample, $t_1$, of the signal. The residual data 216 may be in the form of a set of residual elements. In this example, the set of residual elements 216 is arranged as an array of residual elements comprising first and second rows of residual elements. The first row includes residual elements $r_{11}$ and $r_{12}$ and the second row includes residual elements $r_{21}$ and $r_{22}$. A residual element in the set of residual elements 216 is associated with a respective signal element in the input data 206. For example, residual element $r_{12}$ in the residual data 216 is associated with respective signal element $I_{12}$ in the input data 206.

In this example, a given residual element is obtained by subtracting a value of a signal element in the upsampled data 214 from a value of a corresponding signal element in the input data 206. As such, $r_{ij}=I_{ij}-U_{ij}$, where i indicates a row number associated with the element and j indicates a column number associated with the element. Since $I_{ij}=U_{ij}+r_{ij}$, the set of residual elements 216 is useable in combination with the upsampled data 214 to reconstruct the input data 206. The residual data 216 may also be referred to as "reconstruction data" or "enhancement data".

A set of spatial correlation elements 218 is generated using the set of residual elements 216. The term "spatial correlation element" is used herein to indicate an element that is indicative of an extent, or measure, of spatial correlation between a plurality of residual elements in the set of residual elements 216. The correlation elements in the set of spatial correlation elements 218 may also be referred to as "coefficients", "spatial coefficients" or "transformed elements". The set of spatial correlation elements 218 is associated with the first time sample, $t_1$, of the signal. In this example, the set of spatial correlation elements 218 is arranged as an array of data elements comprising first and second rows of signal elements. In this example, the set of spatial correlation elements 218 is arranged as a 2×2 array of correlation elements, A, H, V, D. The elements in the set of spatial correlation elements 218 may be arranged in a form other than a 2×2 array, for example a 4×1 or 1×4 array.

In this example, the set of spatial correlation elements 218 is derived by pre-multiplying the set of residual elements 216 with a transformation matrix (or 'kernel'), K. In this example, the transformation matrix is a 4×4 matrix:

$$K = \frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}.$$

In this example, the set of spatial correlation elements 218 is derived based on the following equation, where the set of spatial correlation elements 218 and the set of residual elements 216 are both shown as 4×1 arrays:

$$\begin{bmatrix} A \\ H \\ V \\ D \end{bmatrix} = \frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix} \cdot \begin{bmatrix} r_{11} \\ r_{12} \\ r_{21} \\ r_{22} \end{bmatrix} \quad (\text{eq. 1})$$

As such, $$A = \frac{1}{4}(r_{11} + r_{12} + r_{21} + r_{22}),$$

$$H = \frac{1}{4}(r_{11} - r_{12} + r_{21} - r_{22}),$$

$$V = \frac{1}{4}(r_{11} + r_{12} - r_{21} - r_{22}) \text{ and}$$

$$D = \frac{1}{4}(r_{11} - r_{12} - r_{21} + r_{22}).$$

A represents an average of the residual elements in the set of residual elements 216. H represents a horizontal correlation and/or 'tilt' between the residual elements in the set of residual elements 216. V represents a vertical correlation and/or 'tilt' between the residual elements in the set of residual elements 216. D represents a diagonal correlation and/or 'tilt' between the residual elements in the set of residual elements 216. The correlation elements described herein thus exploit, and are indicative of an extent of, directional and/or spatial correlation between neighbouring residual elements.

The set of spatial correlation elements 218 may include a delta average value, $\Delta_A$, instead of an average value, A. In some examples, $\Delta_A$ is defined as the difference between an average of signal elements in the input data 206 and an average of corresponding signal elements in the data at the lower level of quality, for example the downsampled data 212 or the processed data 213. In some examples, $\Delta_A$ is derived based on: the average of the values in the set of residual elements 216, A, an average of signal elements in the data at the lower level of quality and an average of signal elements in the upsampled data 214. $\Delta_A$ may be smaller than A and/or may be more likely to be zero than A. This may facilitate efficient encoding of the set of spatial correlation elements 218 and a reduced amount of data transfer between the first apparatus 202 and the second apparatus 204 compared to using the average value, A. The delta average value, $\Delta_A$, may be provided to the second apparatus 202 to enable the second apparatus to calculate the average value, A.

Instead of the first apparatus 202 transmitting the set of residual elements 216 to the second apparatus 204, in some examples the first apparatus 202 transmits the set of spatial correlation elements 218 instead. Since the set of spatial correlation elements 218 exploit spatial redundancy between a plurality of residual elements, the set of spatial correlation elements 218 are likely to be smaller than the set of residual elements 216, for example when there is a relatively strong extent of spatial correlation between residual elements in the set of residual elements 216 at the higher, residual level. The set of spatial correlation elements 218 may comprise spatial correlation elements having values of zero in some cases, which may be particularly efficient to encode. Less data may therefore be used to transmit the set of spatial correlation elements 218 than the set of residual elements 216, for example when there is a relatively strong extent of spatial correlation between residual elements in the set of residual elements 216. The amount of data needed to transmit the set of spatial correlation elements 218 may be larger than or the same size as the amount of data needed to transmit the set of residual elements 216, for example when there is a relatively weak amount of spatial correlation at the residual level.

In this example, the first apparatus 202 transmits output data based on the downsampled data 212 and also transmits the set of spatial correlation elements 218 to the second apparatus 204.

Turning now to FIG. 2B, the second apparatus 204 receives data 220 based on the downsampled data 212 and also receives the set of spatial correlation elements 218. The data 220 based on the downsampled data 212 may be the downsampled data 212 itself, the processed data 213, or data derived from the downsampled data 212 or the processed data 213.

In some examples, the received data 220 comprises the processed data 213, which may comprise the encoded signal at the relatively low level of quality and/or the correction data. In some examples, for example where the first apparatus 202 has processed the downsampled data 212 to generate the processed data 213, the second apparatus 204 processes the received data 220 to generate processed data 222. Such processing by the second apparatus 204 may comprise decoding an encoded signal to produce a decoded signal at the relatively low level of quality. In some examples, the processing by the second apparatus 204 comprises correcting the decoded signal using obtained correction data. In some examples, the encoded signal at the relatively low level of quality is decoded by a decoding device that is separate from the second apparatus 204. The encoded signal at the relatively low level of quality may be decoded using an H.264 decoder.

In other examples, the received data 220 comprises the downsampled data 212 and does not comprise the processed data 213. In some such examples, the second apparatus 204 does not process the received data 220 to generate processed data 222.

The second apparatus 204 uses data at the relatively low level of quality to derive the upsampled data 214. As indicated above, the data at the relatively low level of quality may comprise the processed data 222, or the received data 220 where the second apparatus 204 does not process the received data 220 at the relatively low level of quality. The upsampled data 214 is a preliminary rendition of the first time sample, $t_1$, of the signal at the relatively high level of quality. The upsampled data 214 may be derived by performing an upsampling operation on the data at the relatively low level of quality.

The second apparatus 204 obtains the set of residual elements 216 based at least in part on the set of spatial correlation elements 218 received from the first apparatus 202. The set of residual elements 216 is useable with the upsampled data 214 to reconstruct the input data 206. The set of residual elements 216 is indicative of a comparison between the input data 206 and the upsampled data 214.

The second apparatus 204 may retrieve an inverse of the transformation matrix used by the first apparatus 202 to generate the set of spatial correlation elements 218 and derive the set of residual elements 216 based on a pre-multiplication of the set of spatial correlation elements 218 by the inverse of the transformation matrix.

The set of spatial correlation elements 218 exploit spatial correlation between residual elements. However, since the set of residual elements 216, and therefore also the set of spatial correlation elements 218, are indicative of only a single time sample of the signal, no temporal correlation is exploited by the set of spatial correlation elements 218. For example, where the signal is a video signal, the set of residual elements 216 are obtained on an image-by-image basis and do not exploit temporal correlation between the component images of the video signal.

Figure 3A:
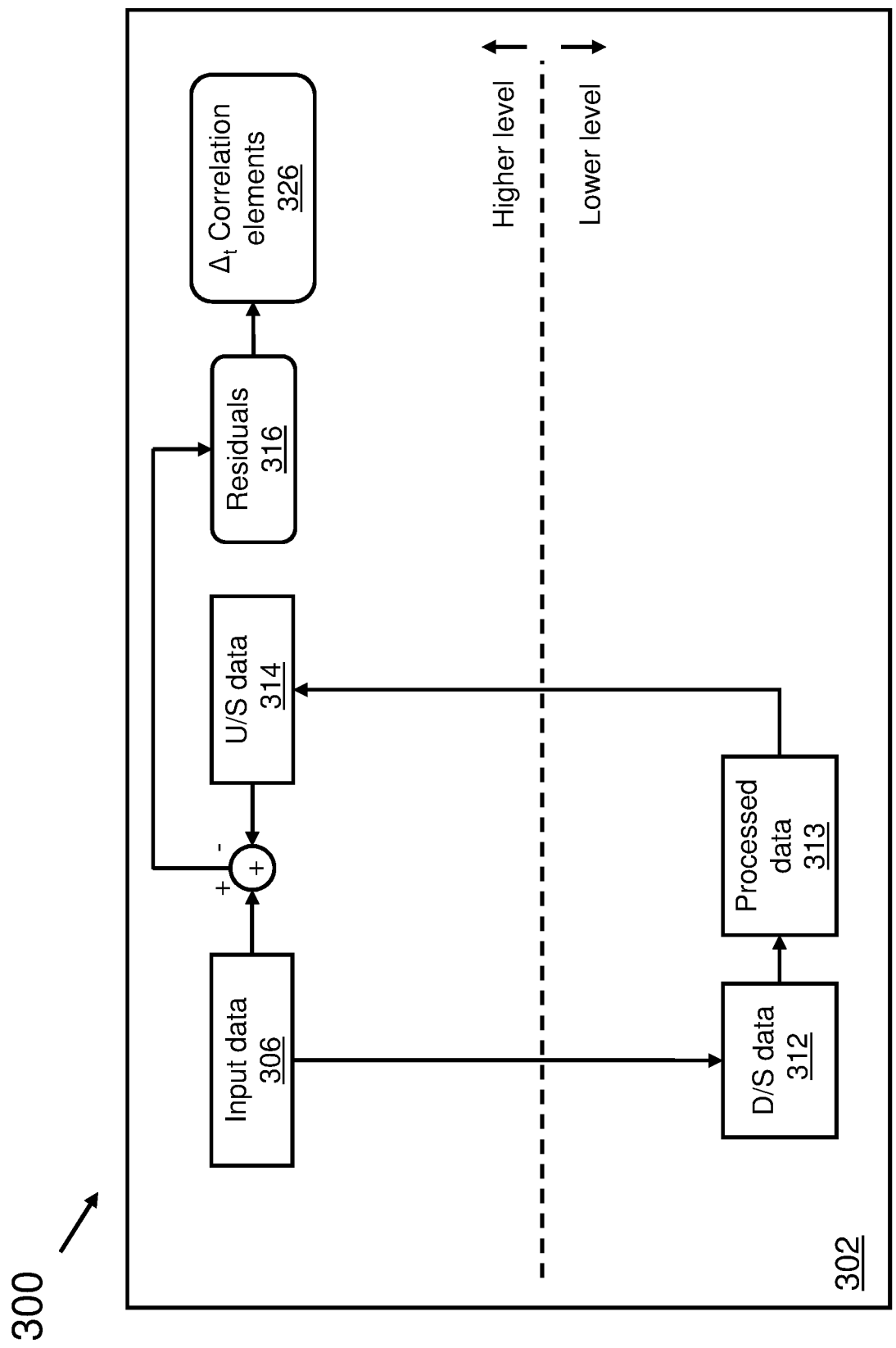
FIGS. 3A and 3B show a schematic block diagram of another example of a signal processing system in accordance with an embodiment of the present invention.
Figure 3B:
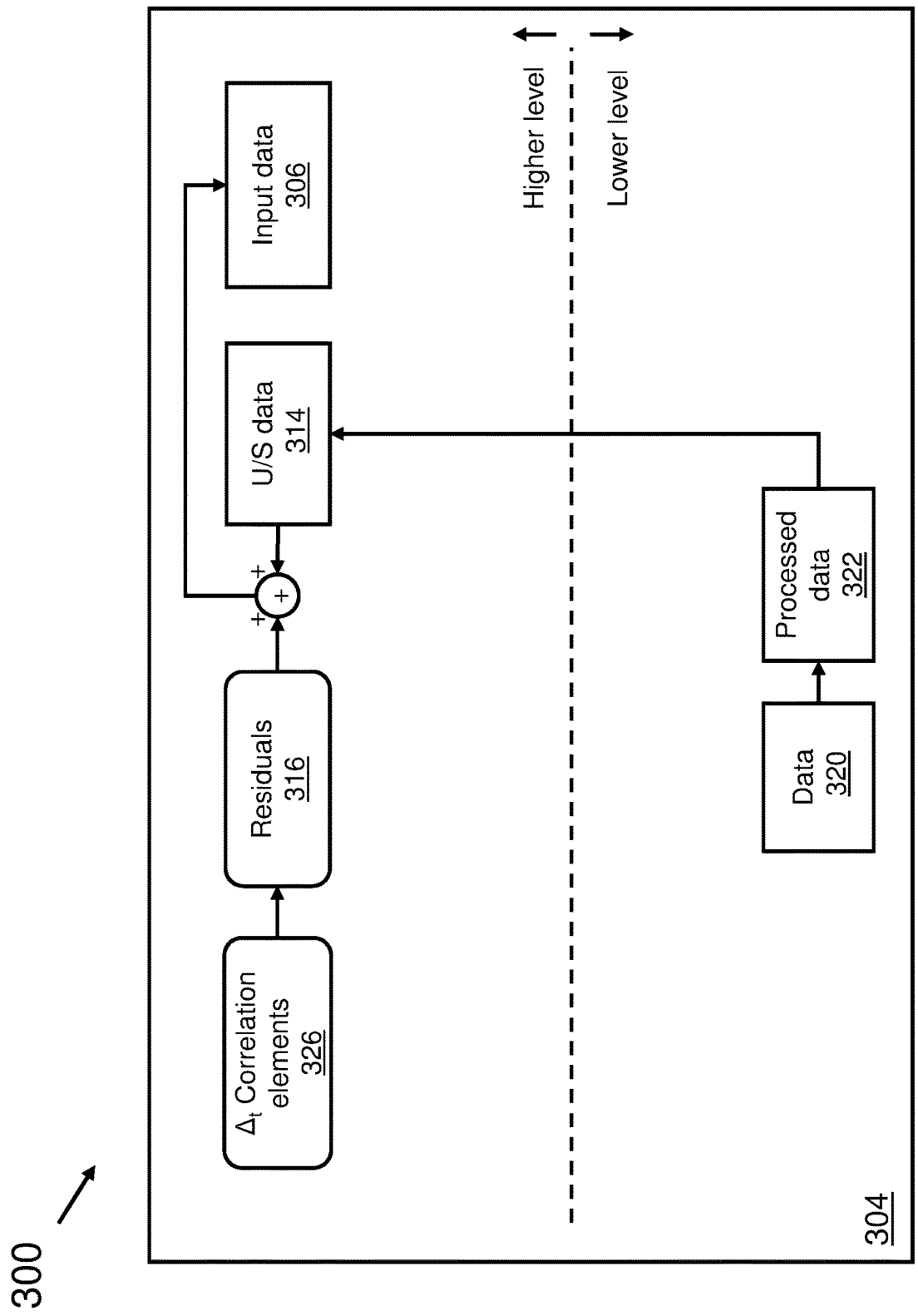

Referring to FIGS. 3A and 3B there is shown schematically an example of a signal processing system 300. Some items depicted in FIGS. 3A and 3B are similar to items shown in FIGS. 2A and 2B. Corresponding reference signs, incremented by 100, have therefore been used for similar items.

Referring first to FIG. 3A, the first apparatus 302 obtains input data 306 at the relatively high level of quality. The input data 306 comprises a first rendition of a first time sample, $t_1$, of a signal at the relatively high level of quality. The first apparatus 302 uses the input data 306 to derive downsampled data 312 at the relatively low level of quality, for example by performing a downsampling operation on the input data 306. Where the downsampled data 312 is processed at the relatively low level of quality, such processing generates processed data 313 at the relatively low level of quality. However, as indicated above, in some examples no processing is performed on the downsampled data 312. Data at the relatively low level of quality is used to derive upsampled data 314 at the relatively high level of quality, for example by performing an upsampling operation on the data at the relatively low level of quality. The upsampled data 314 comprises a second rendition of the first time sample of the signal at the relatively high level of quality. The first apparatus 302 obtains a set of residual elements 316 useable to reconstruct the input data 306 using the upsampled data 314. The set of residual elements 316 is associated with the first time sample, $t_1$, of the signal. The set of residual elements 316 is obtained by comparing the input data 306 with the upsampled data 314.

In this example, the first apparatus 302 generates a set of spatio-temporal correlation elements 326. The term "spatio-temporal correlation element" is used herein to mean a correlation element that indicates, in addition to an extent of spatial correlation between residual elements, an extent of temporal correlation. In this example, the set of spatio-temporal correlation elements 326 is associated with both the first time sample, $t_1$, of the signal, and a second time sample, $t_0$, of the signal. This is in contrast with the spatial correlation elements in the set of spatial correlation elements 218 described above, which are associated with only the first time sample of the signal, $t_1$. In the examples described herein, the second time sample, $t_0$, is an earlier time sample relative to the first time sample. In other examples, however, the second time sample, $t_0$, is a later time sample relative to the first time sample, $t_1$. In some examples, where the input data 306 comprises a sequence of time samples, an earlier time sample means a time sample that precedes the first time sample, $t_1$, in the input data. Where the first time sample, $t_1$, and the earlier time sample are arranged in presentation order, the earlier time sample precedes the first time sample, $t_1$.

The second time sample, $t_0$, may be an immediately preceding time sample in relation to the first time sample, $t_1$. In some examples, the second time sample, $t_0$, is a preceding time sample relative to the first time sample, $t_1$, but not an immediately preceding time sample relative to the first time sample, $t_1$.

In this example, the set of spatio-temporal correlation elements 326 is indicative of an extent of spatial correlation between a plurality of residual elements in the set of residual elements 316. The set of spatio-temporal correlation elements 326 is also indicative of an extent of temporal correlation between first reference data based on the input data 306 and second reference data based on a rendition of the second time sample, $t_0$, of the signal, for example at the relatively high level of quality. The first reference data is therefore associated with the first time sample, $t_1$, of the signal, and the second reference data is associated with the second time sample, $t_0$, of the signal. The first reference data and the second reference data are used as references or comparators for determining an extent of temporal correlation in relation to the first time sample, $t_1$, of the signal and the second time sample, $t_2$, of the signal. The first reference data and/or the second reference data may be at the relatively high level of quality.

In some examples, the first reference data and the second reference data comprise first and second sets of spatial correlation elements, respectively, the first set of spatial correlation elements being associated with the first time sample, $t_1$, of the signal, and the second set of spatial correlation elements being associated with the second time sample, $t_0$, of the signal.

In other examples, the first reference data and the second reference data comprise first and second renditions of the signal, respectively, the first rendition being associated with the first time sample, $t_1$, of the signal, and the second rendition being associated with the second time sample, $t_0$, of the signal.

The set of spatio-temporal correlation elements 326 will be referred to hereinafter as "$\Delta_t$ correlation elements", since, in addition to exploiting the spatial correlation between residual elements, temporal correlation is also exploited using data from a different time sample to generate the $\Delta_t$ correlation elements 326.

In this example, instead of the first apparatus 302 transmitting the set of spatial correlation elements 218 to the second apparatus 304, the first apparatus 302 transmits the set of $\Delta_t$ correlation elements 326 instead. Since the set of $\Delta_t$ correlation elements 326 exploit temporal redundancy at the higher, residual level, the set of $\Delta_t$ correlation elements 326 are likely to be smaller than the set of spatial correlation elements 218, for example where there is a strong temporal correlation, and may comprise more correlation elements with zero values in some cases. Less data may therefore be used to transmit the set of $\Delta_t$ correlation elements 326 than the set of spatial correlation elements 218.

Turning now to FIG. 3B, the second apparatus 304 receives data 320 based on the downsampled data 312 and receives the set of $\Delta_t$ correlation elements 326.

Where the first apparatus 302 has processed the downsampled data 312 to generate processed data 313, the second apparatus 304 processes the received data 320 to generate processed data 322. The processing may comprise decoding an encoded signal to produce a decoded signal at the relatively low level of quality. As indicated above, in some examples, the second apparatus 304 does not perform such processing on the received data 320. Data at the relatively low level of quality, for example the received data 320 or the processed data 322, is used to derive the upsampled data 314. The upsampled data 314 may be derived by performing an upsampling operation on the data at the relatively low level of quality.

The second apparatus 304 obtains the set of residual elements 316 based at least in part on the set of $\Delta_t$ correlation elements 326. The set of residual elements 316 is useable to reconstruct the input data 306 using the upsampled data 314.

Figure 4A:
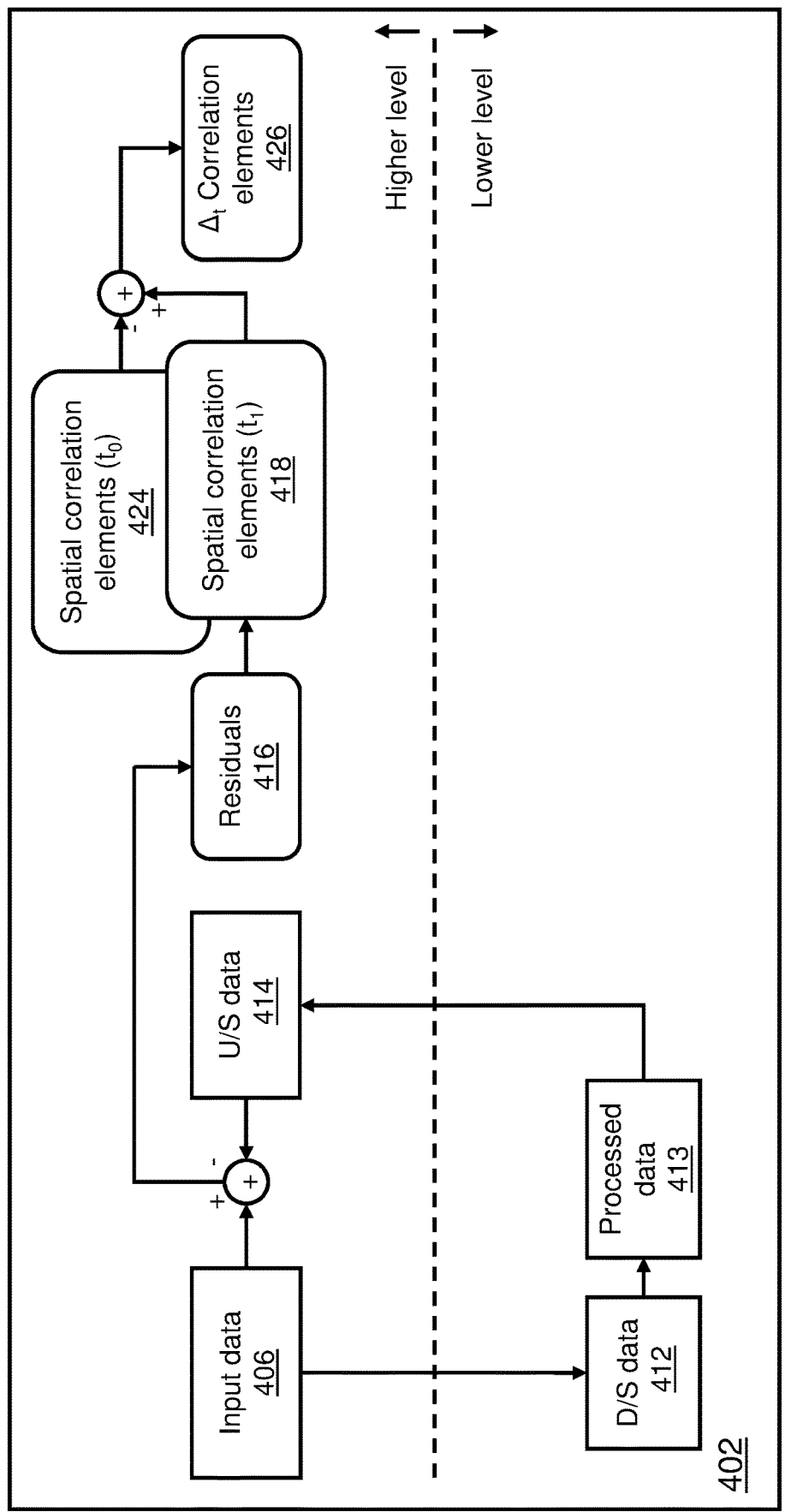
FIGS. 4A and 4B show a schematic block diagram of another example of a signal processing system in accordance with an embodiment of the present invention.
Figure 4B:
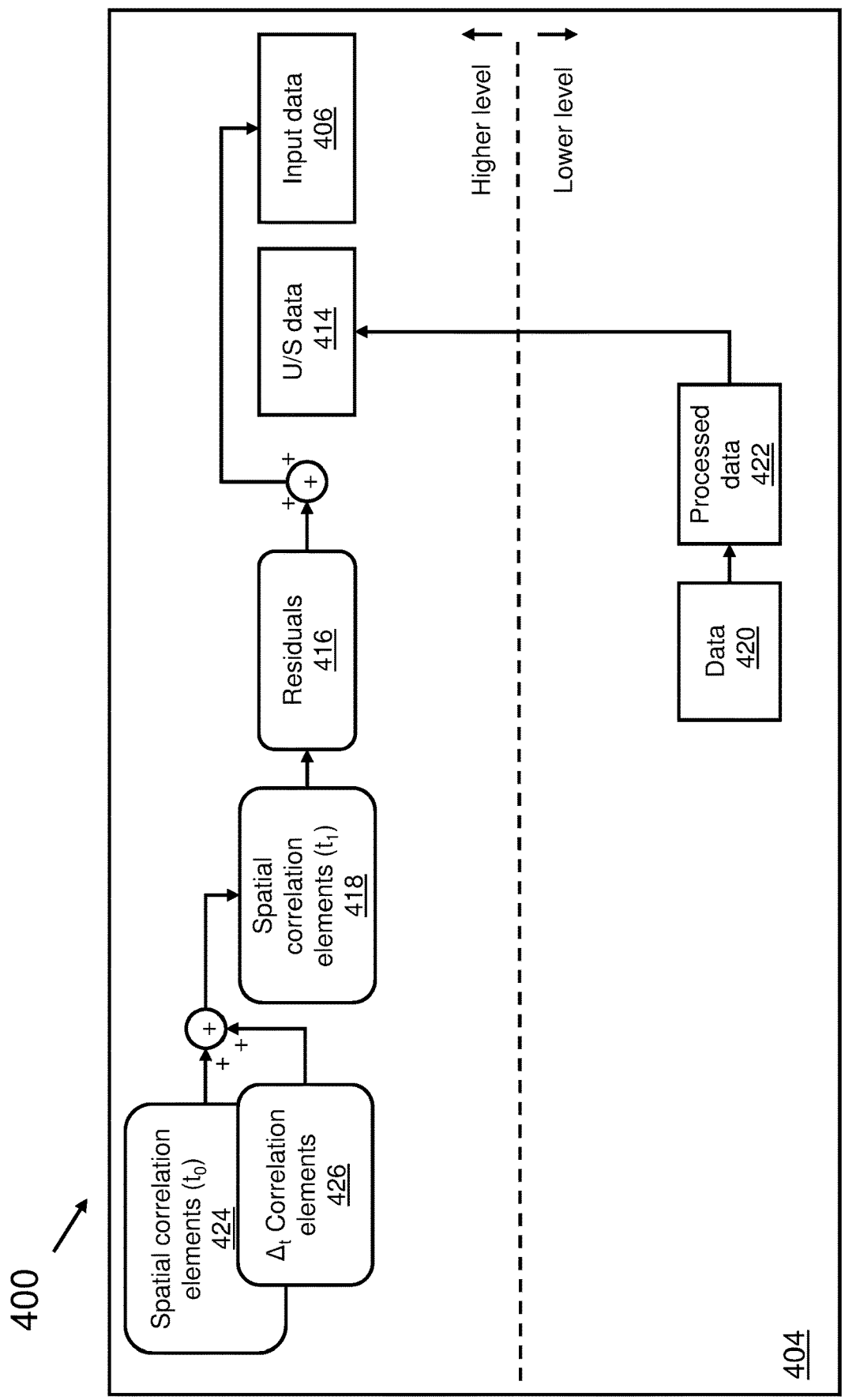

Referring to FIGS. 4A and 4B there is shown schematically an example of a signal processing system 400. Some items depicted in FIGS. 4A and 4B are similar to items shown in FIGS. 2A and 2B. Corresponding reference signs, incremented by 200, have therefore been used for similar items.

Referring first to FIG. 4A, the first apparatus 402 obtains input data 406. The input data 406 comprises a first rendition of a first time sample, $t_1$, of a signal at a relatively high level of quality. The first apparatus 402 uses the input data 406 to derive downsampled data 412. The downsampled data 412 comprises a rendition of the first time sample, $t_1$, of the signal at the relatively low level of quality. In some examples, the downsampled data 412 is processed to generate processed data 413. In other examples, no processing is performed on the downsampled data 412. Data at the relatively low level of quality, for example downsampled data 412 or processed data 413, is used to derive upsampled data 414. The upsampled data 414 comprises a second rendition of the first time sample, $t_1$, of the signal at the relatively high level of quality. The first apparatus 402 obtains a set of residual elements 416 by comparing the input data 406 with the upsampled data 414.

In this example, the first apparatus 402 generates a first set of spatial correlation elements 418 using the set of residual elements 416. The first set of spatial correlation elements 418 is associated with the first time sample, $t_1$, of the signal. At least one correlation element in the first set of spatial correlation elements 418 is indicative of an extent of spatial correlation between a plurality of residual elements in the set of residual elements 416. At least one correlation element in the first set of spatial correlation elements 418 may, for example, indicate a horizontal, vertical and/or diagonal similarity and/or "tilt" between neighbouring residual elements in the set of residual elements 416. The first set of spatial correlation elements 418 exploits spatial correlation but not temporal correlation at the higher, residual level.

In this example, the first apparatus 402 obtains a second set of spatial correlation elements 424. In this example, the second set of spatial correlation elements 424 is associated with a second, earlier time sample, $t_0$, of the signal. The first apparatus 402 may obtain the second set of spatial correlation elements 424 from a local buffer for example. The second set of spatial correlation elements 424 is an example of the second reference data based on the rendition of the second, earlier time sample, $t_0$, of the signal and in relation to which $\Delta_t$ correlation elements can indicate a temporal correlation. At least one correlation element in the second set of spatial correlation elements 424 is indicative of an extent of spatial correlation between a plurality of residual elements in a further set of residual elements, the further set of residual elements being associated with the second, earlier time sample, $t_0$, of the signal. The further set of residual elements is usable to reconstruct a rendition of the second, earlier time sample, $t_0$, of the signal at the relatively high level of quality using data based on a rendition of the second, earlier time sample, $t_0$, of the signal at the relatively low level of quality.

In this example, the first apparatus 402 generates a set of $\Delta_t$ correlation elements 426 based on the first set of spatial correlation elements 418, and based on the second set of spatial correlation elements 424. The set of $\Delta_t$ correlation elements 426 may be generated based on a comparison, for example a difference, between the first set of spatial correlation elements 418 and the second set of spatial correlation elements 424. Consequently, the set of $\Delta_t$ correlation elements 426 is associated with the first time sample, $t_1$, of the signal and with the second, earlier time sample, $t_0$, of the signal. The set of $\Delta_t$ correlation elements 426 is indicative of an extent of spatial correlation between a plurality of residual elements in the set of residual elements 416 and also an extent of temporal correlation between first reference data in the form of the first set of spatial correlation elements 418 and second reference data in the form of the second set of spatial correlation elements 424.

In this example, the first apparatus 402 uses the set of $\Delta_t$ correlation elements 426 to generate first output data, and uses the downsampled data 412 to generate second output data. In some examples, the second output data comprises the downsampled data 412. Where the first apparatus 402 processes the downsampled data 412 to generate an encoded signal, the second output data comprises the encoded signal. The first and the second output data may be output, for example for transmission to the second apparatus 404.

Turning to FIG. 4B, the second apparatus 404 receives data 420 based on the downsampled data 412 and receives the set of $\Delta_t$ correlation elements 426.

Where the first apparatus 402 has processed the downsampled data 412 to generate the processed data 413, the received data 420 is processed by the second apparatus 404 to generate processed data 422 at the relatively low level of quality. In some examples, no processing is performed at the lower level of quality on the received data 420. Data at the relatively low level of quality, for example the received data 420 or the processed data 422, is used to derive the upsampled data 414.

In this example, the second apparatus 404 obtains the second set of spatial correlation elements 424. The second set of spatial correlation elements 424 may be retrieved from a buffer in the second apparatus 404. For example, the second apparatus 404 may have previously received the second set of spatial correlation elements 424 from the first apparatus 402, or may have previously derived the second set of spatial correlation elements 424 from data received from the first apparatus 402.

The second apparatus 404 obtains the first set of spatial correlation elements 418 based on the received set of $\Delta_t$ correlation elements 426 and the obtained second set of spatial correlation elements 424. The first set of spatial correlation elements 418 may be derived by combining the second set of spatial correlation elements 424 with the set of $\Delta_t$ correlation elements 426.

The second apparatus 404 derives the set of residual elements 416 using the first set of spatial correlation elements 418. The second apparatus 404 uses the set of residual elements 416 and the upsampled data 414 to reconstruct the input data 406.

Figure 5A:
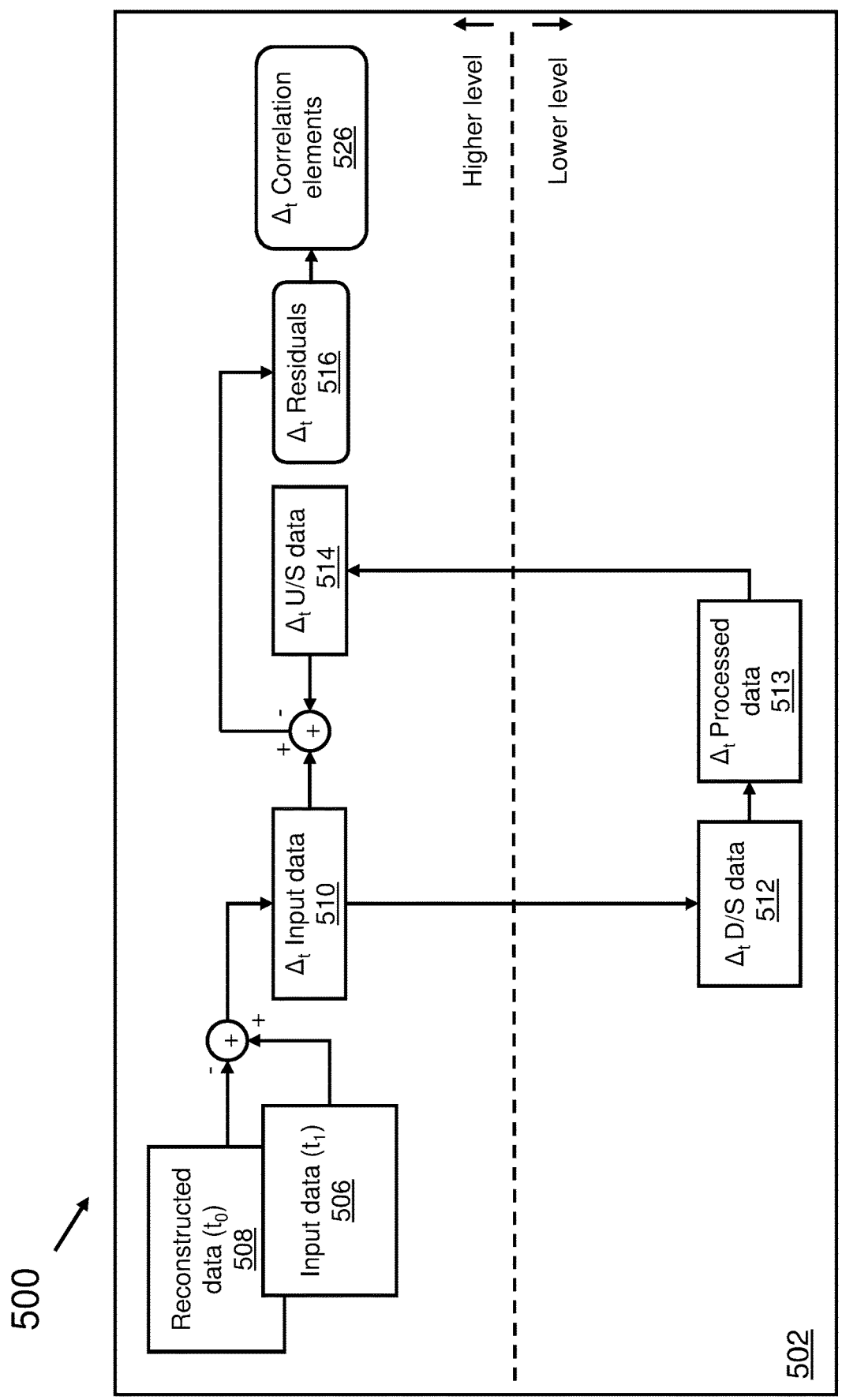
FIGS. 5A and 5B show a schematic block diagram of another example of a signal processing system in accordance with an embodiment of the present invention.
Figure 5B:
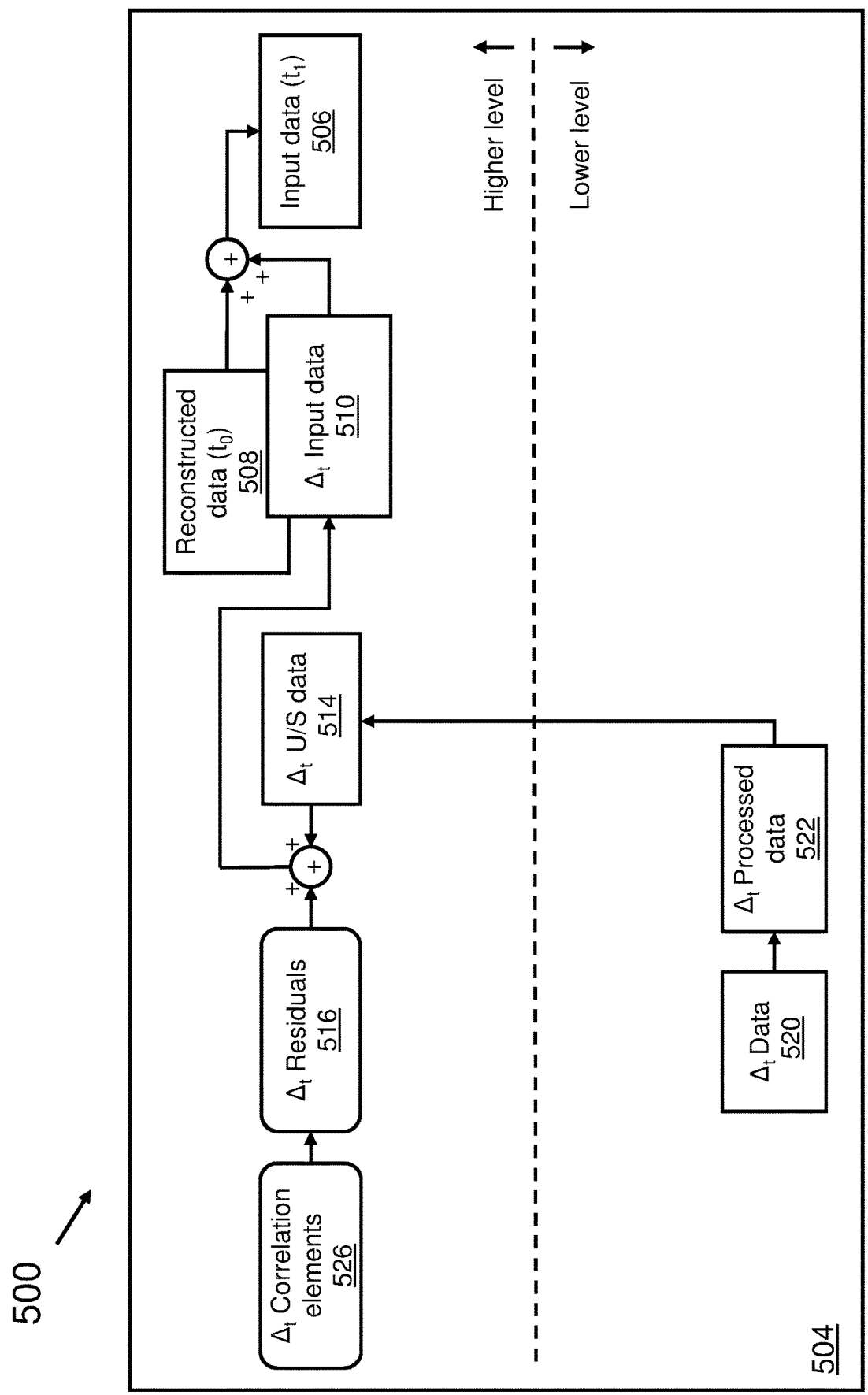

Referring to FIGS. 5A and 5B, there is shown schematically an example of a signal processing system 500. Some items depicted in FIGS. 5A and 5B are similar to items shown in FIGS. 2A and 2B. Corresponding reference signs, incremented by 300, have therefore been used for similar items.

Referring first to FIG. 5A, the first apparatus 502 obtains input data 506. The input data 506 comprises a first rendition of a first time sample, $t_1$, of a signal at a relatively high level of quality.

In this example, the first apparatus 502 obtains a rendition 508 of a second, earlier time sample, $t_0$, of the signal at the relatively high level of quality. For example, the first apparatus 502 may retrieve the rendition 508 of a second, earlier time sample, $t_0$, of the signal at the relatively high level of quality from a local buffer. In this example, the rendition 508 of the second, earlier time sample, $t_0$, of the signal is a reconstructed rendition of the second, earlier time sample, $t_0$, of the signal at the relatively high level of quality and will be referred to hereinafter as "reconstructed data". For example, the reconstructed data may have been obtained by downsampling and upsampling a rendition of the second, earlier time sample, $t_0$, of the signal in a similar manner to that described above. The reconstructed data 508 is another example of second reference data based on a rendition of the second, earlier time sample, $t_0$, of the signal.

The first apparatus 502 derives a differential rendition 510 of the signal at the relatively high level of quality based on first reference data in the form of the input data 506 and second reference data in the form of the reconstructed data 508. The differential rendition 510 may be derived based on a comparison, for example a difference, between the input data 506 and the reconstructed data 508. The differential rendition 510 is hereinafter referred to as "$\Delta_t$ input data" and is associated with both the first time sample, $t_1$, of the signal and the second, earlier time sample, $t_0$, of the signal. The $\Delta_t$ input data 510 is indicative of an extent of temporal correlation between the input data 506 and the reconstructed data 508.

In this example, the first apparatus 502 derives a differential rendition 512 of the signal at the relatively low level of quality based on the $\Delta_t$ input data 510. The differential rendition 512 at the relatively low level of quality is referred to herein as "$\Delta_t$ downsampled data". In some examples, the $\Delta_t$ downsampled data 512 is processed to generate $\Delta_t$ processed data 513. In other examples, no processing is performed at the relatively low level of quality on the $\Delta_t$ downsampled data 512. Data at the relatively low level of quality, for example the $\Delta_t$ downsampled data 512 or the $\Delta_t$ processed data 513, is used to derive a preliminary differential rendition 514 of the signal at the relatively high level of quality. The preliminary differential rendition 514 is referred to hereinafter as "$\Delta_t$ upsampled data 514".

In this example, the first apparatus 502 obtains a set of $\Delta_t$ residual elements 516 by comparing the $\Delta_t$ input data 510 with the $\Delta_t$ upsampled data 514. The set of $\Delta_t$ residual elements 516 is associated with both the first time sample, $t_1$, of the signal and the second, earlier time sample, $t_0$, of the signal.

In this example, the first apparatus 502 generates a set of $\Delta_t$ correlation elements 526 using the set of $\Delta_t$ residual elements 516. The set of $\Delta_t$ correlation elements 526 is associated with the first time sample, $t_1$, of the signal and the second, earlier time sample, $t_0$, of the signal. The set of $\Delta_t$ correlation elements 526 is indicative of an extent of spatial correlation between a plurality of $\Delta_t$ residual elements in the set of $\Delta_t$ residual elements 516 and an extent of temporal correlation between first reference data in the form of the input data 506 and second reference data in the form of the reconstructed data 508.

In this example, the first apparatus 502 generates first output data using the set of $\Delta_t$ correlation elements 526 and generates second output data using the $\Delta_t$ downsampled data 512. The first output data and second output data may be output, for example for transmission to the second apparatus 504.

Turning to FIG. 5B, the second apparatus 504 receives $\Delta_t$ data 520 based on the $\Delta_t$ downsampled data 512 and also receives the set of $\Delta_t$ correlation elements 526.

Where the first apparatus 502 has processed the $\Delta_t$ downsampled data 512 at the relatively low level of quality to generate the $\Delta_t$ processed data 513, the second apparatus 504 processes the received $\Delta_t$ data 520 at the relatively low level of quality to generate $\Delta_t$ processed data 522. Data at the relatively low level of quality, for example the received $\Delta_t$ data 520 or the $\Delta_t$ processed data 522, is used to derive the $\Delta_t$ upsampled data 514.

The second apparatus 504 obtains the set of $\Delta_t$ residual elements 516 based at least in part on the set of $\Delta_t$ correlation elements 526. The set of $\Delta_t$ residual elements 516 may be derived by pre-multiplying the set of $\Delta_t$ correlation elements 526 with an inverse transformation matrix.

In this example, the second apparatus 502 reconstructs the $\Delta_t$ input data 510 based on the set of $\Delta_t$ residual elements 516 and the $\Delta_t$ upsampled data 514. The $\Delta_t$ input data 510 may be derived by combining the set of $\Delta_t$ residual elements 516 with the $\Delta_t$ upsampled data 514.

In this example, the second apparatus 504 obtains the reconstructed data 508. The reconstructed data 508 may, for example, be retrieved from a buffer at the second apparatus 504. The second apparatus 504 may have derived the reconstructed data 508 previously.

The second apparatus 504 reconstructs the input data 506 based on the $\Delta$ input data 510 and the reconstructed data 508. The input data 506 comprises a rendition of the first time sample, $t_1$, of the signal at the relatively high level of quality.

Figure 6:
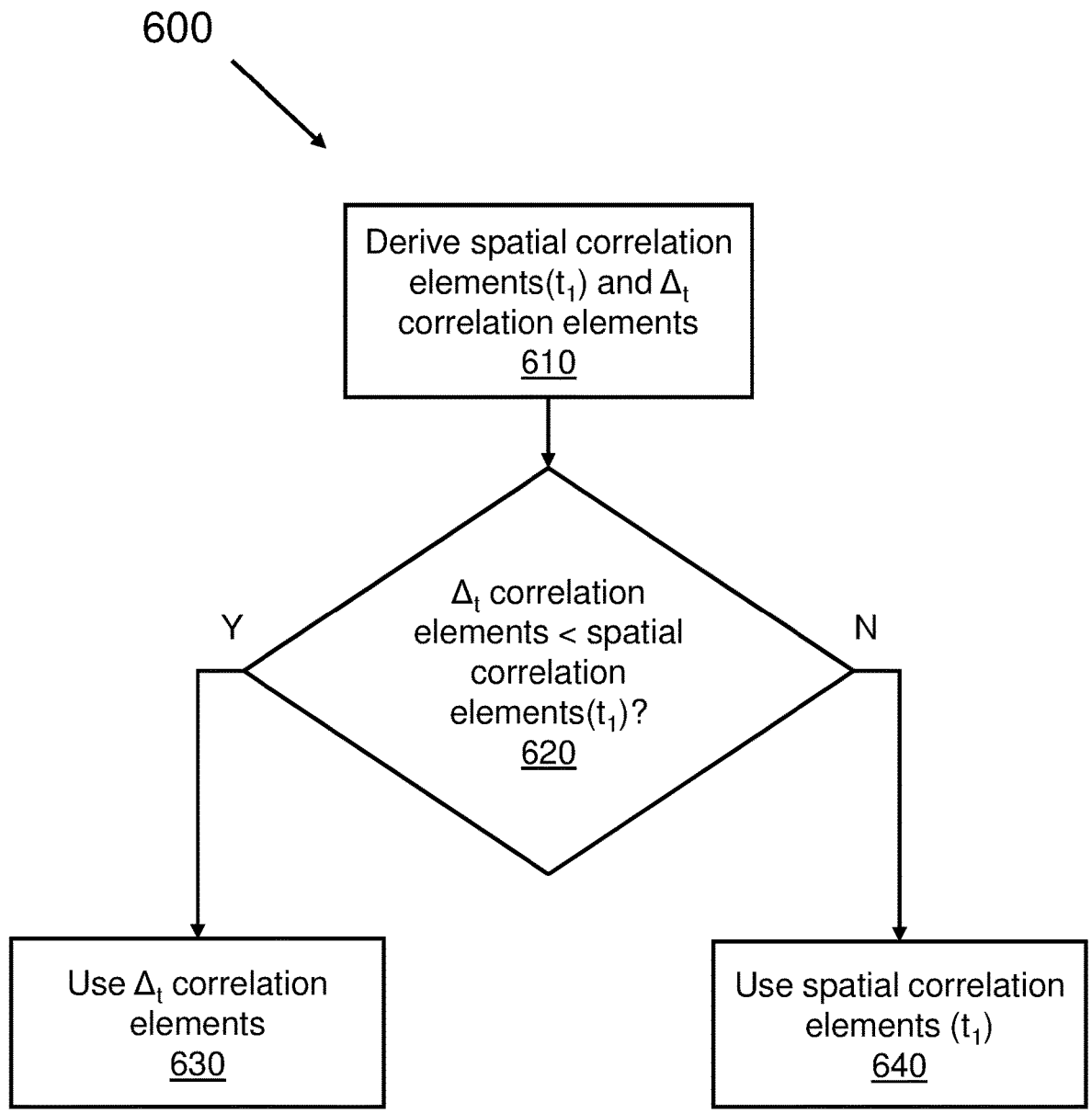
FIG. 6 is a flow diagram depicting an example of a method in accordance with an embodiment of the present invention.

Referring to FIG. 6, there is shown an example of a method 600 of processing data. The method 600 may be performed by an apparatus comprising an encoder device such as any of first apparatuses 102, 202, 302, 402, 502 described above.

At item 610, a set of spatial correlation elements associated with the first time sample and a set of $\Delta_t$ correlation elements are derived. The set of spatial correlation elements and the set of $\Delta_t$ correlation elements may both be derived so that they can be analysed to determine whether use of the set of spatial correlation elements or the set of $\Delta_t$ correlation elements would be preferable. This may be based on the amount of data that would be used to transmit the set of spatial correlation elements or the set of $\Delta_t$ correlation elements.

At item 620, the derived set of spatial correlation elements and the derived set of $\Delta$ correlation elements are used to perform a comparison between the derived set of spatial correlation elements and the derived set of $\Delta_t$ correlation elements. The comparison may, for example, comprise a rate-distortion analysis conducted in relation to the set of spatial correlation elements and the set of $\Delta_t$ correlation elements. In such a rate-distortion analysis, the "rate" may be indicative of a calculated number of bits per data symbol to be stored and/or transmitted, and the "distortion" may be indicative of an estimated error, for example a mean-squared error, arising from the reconstruction of the data by a receiver. The set of spatial correlation elements and the derived set of $\Delta_t$ correlation elements may be compared in order to reduce the number of bits to be transmitted while not exceeding a predetermined amount of distortion. In this example, the comparison comprises determining whether a sum of absolute values of the set of $\Delta_t$ correlation elements is less than a sum of absolute values of the set of spatial correlation elements.

In some examples, the comparison comprises generating first reconstructed data and second reconstructed data. The first reconstructed data is generated using the set of $\Delta$ correlation elements. The second reconstructed data is generated using the set of spatial correlation elements. The first reconstructed data and the second reconstructed data may each be compared to input data. For example, a first sum of absolute differences may be determined between the first reconstructed data and the input data and a second sum of absolute differences may be determined between the second reconstructed data and the input data. A minimum of the first sum of absolute differences and the second sum of absolute differences may be determined. In such examples, the comparison results in a determination of which one of the set of $\Delta_t$ correlation elements and the set of spatial correlation elements produces a better reconstruction, that is, a reconstruction that is a closer representation of the input data, by virtue of it having a lower sum of absolute differences than the other.

Quantisation may be performed on the set of spatial correlation elements and the derived set of $\Delta_t$ correlation elements before the comparison. Performing quantisation before the comparison may allow quantisation errors to be known and/or taken into account during the comparison.

At item 630, if it is determined at item 620 that the sum of the absolute values of the set of $\Delta_t$ correlation elements is less than the sum of the absolute values of the set of spatial correlation elements, the set of $\Delta_t$ correlation elements is selected for inclusion in the first output data. In such examples, the first output data comprises the set of $\Delta_t$ correlation elements. This case may be referred to as "intra- and inter-frame" coding, since the first output data is indicative of both spatial ("intra-frame") and temporal ("inter-frame") correlation.

At item 640, if it is determined at item 620 that the sum of the absolute values of the set of $\Delta_t$ correlation elements is not less than the sum of the absolute values of the set of spatial correlation elements, the set of spatial correlation elements is selected for inclusion in the output data. In such examples, the first output data comprises the set of spatial correlation elements. This case may be referred to as "intra-frame only" coding, since the first output data is indicative of spatial correlation ("intra"), but not temporal ("inter") correlation.

In some examples, the apparatus may be configured such that, if it is determined, at item 620, that the sum of the absolute values of the $\Delta_t$ correlation elements is equal to or negligibly different from the sum of the absolute values of the spatial correlation elements, the set of spatial correlation elements is selected for inclusion in the first output data. In other examples, the apparatus may be configured such that, if it is determined at item 620 that the sum of the absolute values of the $\Delta_t$ correlation elements is equal to or negligibly different from the sum of the absolute values of the spatial correlation elements, the set of $\Delta_t$ correlation elements is selected for inclusion in the first output data.

The derived set of $\Delta_t$ correlation elements is therefore used to generate the first output data. In some examples, using the derived set of $\Delta_t$ correlation elements to generate first output data comprises selecting either the derived set of $\Delta_t$ correlation elements or the derived set of correlation elements for inclusion in the first output data. The derived set of $\Delta_t$ correlation elements may therefore be used to generate the first output data even if the derived set of $\Delta_t$ correlation elements is not itself comprised in the first output data.

The first output data may be outputted for transmission to at least one other apparatus. The first output data may comprise a sequence of values, for example a bit sequence. In some examples, the first output data comprises a quantised version of whichever of the set of $\Delta_t$ correlation elements and the set of spatial correlation elements is selected for inclusion in the first output data. In some examples, the first output data is generated by performing an encoding operation on whichever of the set of $\Delta_t$ correlation elements and the set of spatial correlation elements is selected for inclusion in the first output data.

In some examples, data output by the apparatus includes data indicative of a result of the selection. In some examples the data indicative of the result of the selection is in the first output data. In some examples, the data indicative of the result of the selection is an indicator flag to indicate whether the set of spatial correlation elements or the set of $\Delta_t$ correlation elements has been selected for use in the output data. In some examples, the indicator flag is a single bit in a bit sequence. The presence of such a flag enables the at least one other apparatus, for example a decoder device, to determine how the data it receives has been derived and/or how it may be used.

In some examples, the indicator flag is included in a bit sequence associated with a given data element in the output data. The given data element may be subject to more quantisation than other data elements in order to accommodate the indicator flag without increasing the overall size of the bit sequence. The given data element may be associated with an H correlation element from the set of spatial correlation elements or a $\Delta$H correlation element from the set of $\Delta_t$ correlation elements. In other words, the given data element may be indicative of an extent of horizontal correlation or "tilt" between a plurality of residual elements. A given data element may be selected to contain the indicator flag based on a likelihood of its associated bit sequence having at least one non-zero value. For example, an H spatial correlation element may be more likely to have non-zero values in its associated bit sequence than other spatial correlation elements. A bit sequence with a higher likelihood of having at least one non-zero value may be less impacted by the inclusion of an indicator flag than a bit sequence with a lower likelihood of having at least one non-zero value. A given data element may be selected to contain the indicator flag based on a determined effect of additional quantisation of the given data element. For example, additional quantisation of an H spatial correlation element may be less detrimental in terms of visual quality than additional quantisation of other spatial correlation elements.

The method 600 can be performed for an entire time sample of a signal or for a part of a time sample of a signal. The method 600 can be performed for different parts of the same time sample of the signal with different outcomes. For example, a first part of a first time sample of a signal may have residual elements with values $r_{1,11}(t_1)=4$, $r_{1,12}(t_1)=-2$, $r_{1,21}(t_1)=12$ and $r_{1,22}(t_1)=4$. Referring to eq. 1 above, the set of spatial correlation elements for this first part of the first time sample of the signal, $[A_1(t_1), H_1(t_1), V_1(t_1), D_1(t_1)]$, may thus be calculated as the following: $A_1(t_1)=(4-2+12+4)/4=4.5$; $H_1(t_1)=(4-(-2)+12-4)/4=3.5$; $V_1(t_1)=(4-2-12-4)/4=-3.5$; $D_1(t_1)=(4-(-2)-12+4)/4=-0.5$. The sum of the absolute values of the set of spatial correlation elements for the first part of the first time sample of signal is $4.5+3.5+3.5+0.5=12$.

A second set of spatial correlation elements for this first part of the signal, associated with an earlier time sample, may have values $[A_1(t_0), H_1(t_0), V_1(t_0), D_1(t_0)]=[3.5, 3.5, -1, 0]$. Consequently, a derived set of $\Delta_t$ correlation elements for the first part of the signal may have values $[\Delta A_1(t_1-t_0), \Delta H_1(t_1-t_0), \Delta V_1(t_1-t_0), \Delta D_1(t_1-t_0)]=[4.5-3.5, 3.5-3.5, -3.5-(-1), -0.5-0]=[1, 0, -2.5, -0.5]$. The sum of the absolute values of the set of $\Delta_t$ correlation elements for the first part of the signal is $1+0+2.5+0.5=4$. Therefore, for this first part of the signal, the sum of the absolute values of the set of $\Delta_t$ correlation elements is less than the sum of the absolute values of the set of spatial correlation elements. Consequently, the set of $\Delta_t$ correlation elements may be selected for inclusion in the first output data for the first part of the signal, instead of the set of spatial correlation elements being used.

A second part of the first time sample of the signal may, for example, have residual elements with values $r_{2,11}(t_1)=2$, $r_{2,12}(t_1)=6$, $r_{2,21}(t_1)=-1$ and $r_{2,22}(t_1)=0$. The set of spatial correlation elements for this second part of the given time sample of the signal, $[A_2(t_1), H_2(t_1), V_2(t_1), D_2(t_1)]$, may thus be calculated as the following: $A_2(t_1)=(2+6-1+0)/4=1.75$; $H_2(t_1)=(2-6+(-1)-0)/4=-1.25$; $V_2(t_1)=(2+6-(-1)-0)/4=2.25$; $D_2(t_1)=(2-6-(-1)+0)/4=-0.75$. The sum of the absolute values of the set of spatial correlation elements for the second part of the first time sample of the signal is $1.75+1.25+2.25+0.75=6$.

A second set of spatial correlation elements for this second part of the signal, associated with the earlier time sample, may have values $[A_2(t_0), H_2(t_0), V_2(t_0), D_2(t_0)]=[-2.5, 2, 0, 1.5]$. Consequently, a derived set of $\Delta_t$ correlation elements for the second part of the signal may have values $[\Delta A_2(t_1-t_0), \Delta H_2(t_1-t_0), \Delta V_2(t_1-t_0), \Delta D_2(t_1-t_0)]$=[1.75+2.5), −1.25−2, 2.25−0, −0.75−1.5]=[4.25, −3.25, 2.25, −2.25]. The sum of the absolute values of the set of $\Delta_t$ correlation elements for the second part of the signal is 4.25+3.25+2.25+2.25=12. Therefore, for this second part of the signal, the sum of the absolute values of the set of $\Delta_t$ correlation elements is not less than the sum of the absolute values of the set of spatial correlation elements. Consequently, the set of spatial correlation elements may be selected for inclusion in the first output data for the second part of the signal, instead of the set of $\Delta_t$ correlation elements being used.

An indicator flag may be used for each part of the time sample of the signal to indicate whether set of $\Delta_t$ correlation elements or the set of spatial correlation elements has been used for that part of the signal.

Choosing between outputting the set of spatial correlation elements or the set of $\Delta_t$ correlation elements for a given part or region of a signal provides a flexible mechanism for exploiting spatial and temporal redundancy at a residual level. For parts of a signal exhibiting a relatively strong degree of temporal correlation at the residual level, $\Delta_t$ correlation elements are likely to be smaller than spatial correlation elements and may comprise more zero values. Less data may therefore be used to transmit the set of $\Delta_t$ correlation elements. On the other hand, for parts of the signal exhibiting a relatively weak degree of temporal correlation at the residual level, spatial correlation elements may be smaller than $\Delta_t$ correlation elements and may comprise more zero values. Less data may therefore be used to transmit the set of spatial correlation elements. $\Delta_t$ correlation elements may however be more computationally complex to process compared with spatial correlation elements, for example by a decoder. An increase in complexity may be weighed against a reduction in an amount of data traffic in order to intelligently determine whether to use spatial correlation elements or $\Delta_t$ correlation elements for a given part of a signal. Consequently, a flexible and adaptable data processing technique is provided. For example, the data processing technique may be adapted based on the strength of spatial and temporal correlations at the residual level.

Figure 7:
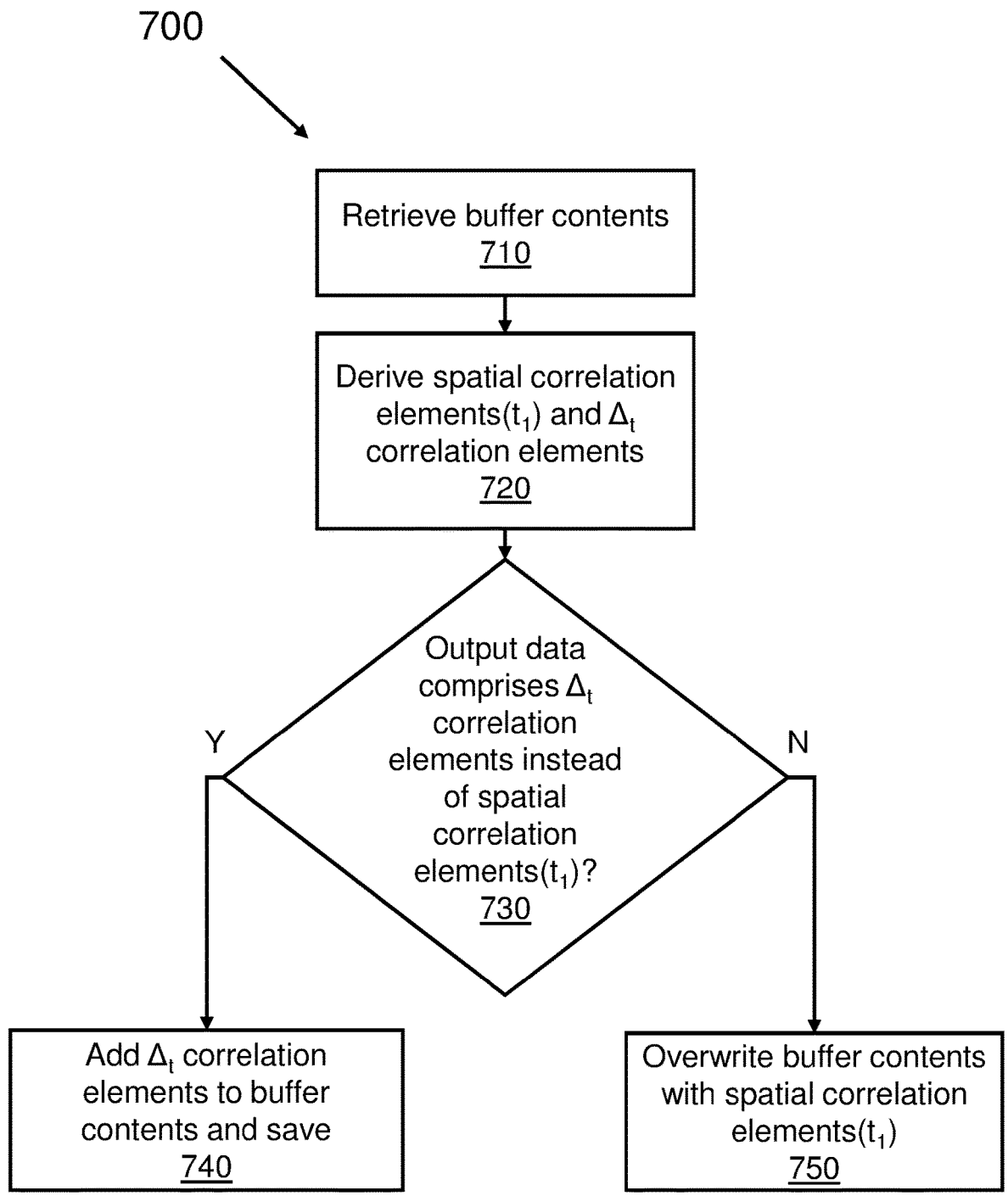
FIG. 7 is a flow diagram depicting another example of a method in accordance with an embodiment of the present invention.

Referring to FIG. 7, there is shown an example of a method 700 of processing data. The method 700 may be performed by an apparatus comprising an encoder device such as any of first apparatuses 102, 202, 302, 402, 502 described above.

At item 710, first buffer data is retrieved from a buffer. The first buffer data may comprise data based on a rendition of an earlier time sample, $t_0$ of a signal. The data based on a rendition of an earlier time sample, $t_0$ of a signal may for example be reconstruction data or a set of spatial correlation elements associated with the earlier time sample, $t_0$ of the signal. In some examples, the second reference data, in relation to which the set of $\Delta_t$ correlation elements indicates a temporal correlation, is obtained based on the first buffer data. The first buffer data may comprise and/or may be used to derive, for example, a set of spatial correlation elements associated with the earlier time sample, $t_0$, of the signal.

At item 720, a set of spatial correlation elements associated with a current time sample, $t_1$, of the signal, and a set of $\Delta_t$ correlation elements associated with both the earlier and the current time sample of the signal, are generated.

At item 730, it is determined whether to select the set of $\Delta_t$ correlation elements for inclusion in the first output data, instead of the derived set of spatial correlation elements associated with the current time sample, $t_1$, of the signal.

Second buffer data is generated using the set of $\Delta_t$ correlation elements and/or the set of special correlation elements associated with the current time sample of the signal. The second buffer data is used to overwrite the first buffer data, thereby updating the buffer.

If the set of $\Delta_t$ correlation elements is selected for inclusion in the first output data, the second buffer data is generated using the set of $\Delta_t$ correlation elements at item 740. The buffer may then be updated. Updating the buffer comprises overwriting the first buffer data with the second buffer data. In this example, the second buffer data is generated by combining the set of $\Delta_t$ correlation elements with the first buffer data. In other words, the set of $\Delta_t$ correlation elements are added to the previous buffer contents to generate the new buffer contents.

If the set of spatial correlation elements associated with the current time sample of the signal is selected for inclusion in the first output data, the second buffer data is generated using the set of spatial correlation elements associated with the current time sample of the signal at item 750. The buffer may then be updated by overwriting the first buffer data with the second buffer data. In this example, the second buffer data is not derived based on the first buffer data. In other words, the set of spatial correlation elements replaces the previous buffer contents instead of being added to it.

Updating the buffer by adding the set of $\Delta_t$ correlation elements to the previous buffer contents may, over time, result in the propagation of errors, for example arising from errors associated with quantisation. In some examples, the buffer is updated by overwriting the first buffer data with second buffer data comprising at least one zero value. This may correspond to a 'reset' of all or part of the buffer. Consequently, for a later time sample, $t_2$, of the signal, the first buffer data retrieved from the buffer is zero. Since the set of $\Delta_t$ correlation elements results from a difference between the set of correlation elements associated with the later time sample, $t_2$, of the signal and the retrieved first buffer data, the set of $\Delta_t$ correlation elements and the set of spatial correlation elements associated with the later time sample, $t_2$, of the signal will be the same. This allows the buffer to be overwritten with the set of correlation elements associated with the later time sample, $t_2$, of the signal, namely the spatial correlation elements, regardless of whether the set of $\Delta_t$ correlation elements or the set of spatial correlation elements is selected for inclusion in the first output data. Consequently, the propagation of errors that may have accumulated from previous time samples can be reduced. In an example, the buffer is reset in this way intermittently, for example periodically. In another example, the buffer is reset when it is determined that errors associated with the first buffer data have reached or exceeded a given threshold.

Figure 8:
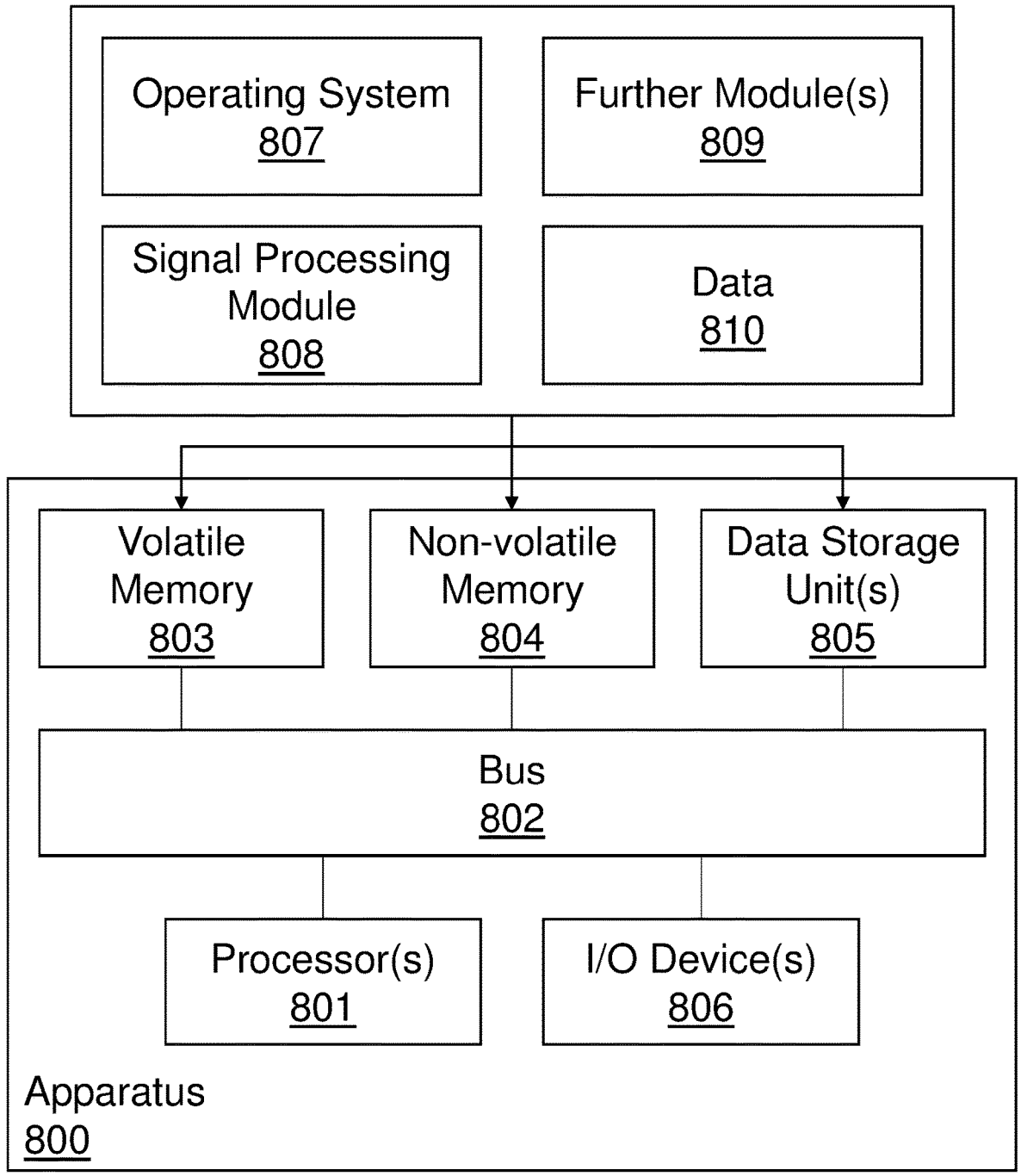
FIG. 8 shows a schematic block diagram of an example of an apparatus in accordance with an embodiment of the present invention.

Referring to FIG. 8, there is shown a schematic block diagram of an example of an apparatus 800.

In an example, the apparatus 800 comprises a decoder device. In another example, the apparatus 800 comprises an encoder device.

Other examples of apparatus 800 include, but are not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, mobile device, video game console, handheld video game device, a peripheral device such as a switch, modem, router, etc., or in general any type of computing or electronic device.

In this example, the apparatus 800 comprises one or more processors 801 configured to process information and/or instructions. The one or more processors 801 may comprise a central processing unit (CPU). The one or more processors 801 are coupled with a bus 802. Operations performed by the one or more processors 801 may be carried out by hardware and/or software. The one or more processors 801 may comprise multiple co-located processors or multiple disparately located processors.

In this example, the apparatus 800 comprises computer-useable volatile memory 803 configured to store information and/or instructions for the one or more processors 801. The computer-useable volatile memory 803 is coupled with the bus 802. The computer-useable volatile memory 803 may comprise random access memory (RAM).

In this example, the apparatus 800 comprises computer-useable non-volatile memory 804 configured to store information and/or instructions for the one or more processors 801. The computer-useable non-volatile memory 804 is coupled with the bus 802. The computer-useable non-volatile memory 804 may comprise read-only memory (ROM).

In this example, the apparatus 800 comprises one or more data-storage units 805 configured to store information and/or instructions. The one or more data-storage units 805 are coupled with the bus 802. The one or more data-storage units 805 may for example comprise a magnetic or optical disk and disk drive or a solid-state drive (SSD).

In this example, the apparatus 800 comprises one or more input/output (I/O) devices 806 configured to communicate information to and/or from the one or more processors 801. The one or more I/O devices 806 are coupled with the bus 802. The one or more I/O devices 806 may comprise at least one network interface. The at least one network interface may enable the apparatus 800 to communicate via one or more data communications networks. Examples of data communications networks include, but are not limited to, the Internet and a Local Area Network (LAN). The one or more I/O devices 806 may enable a user to provide input to the apparatus 800 via one or more input devices (not shown). The one or more input devices may include for example a remote control, one or more physical buttons etc. The one or more I/O devices 806 may enable information to be provided to a user via one or more output devices (not shown). The one or more output devices may for example include a display screen.

Various other entities are depicted for the apparatus 800. For example, when present, an operating system 807, signal processing module 808, one or more further modules 809, and data 810 are shown as residing in one, or a combination, of the computer-usable volatile memory 803, computer-usable non-volatile memory 804 and the one or more data-storage units 805. The signal processing module 808 may be implemented by way of computer program code stored in memory locations within the computer-usable non-volatile memory 804, computer-readable storage media within the one or more data-storage units 805 and/or other tangible computer-readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips or as an Application Specific Integrated Circuit (ASIC).

The apparatus 800 may therefore comprise a signal processing module 808 which can be executed by the one or more processors 801. The signal processing module 808 can be configured to include instructions to implement at least some of the operations described herein. During operation, the one or more processors 801 launch, run, execute, interpret or otherwise perform the instructions in the signal processing module 808.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program.

It will be appreciated that the apparatus 800 may comprise more, fewer and/or different components from those depicted in FIG. 8.

The apparatus 800 may be located in a single location or may be distributed in multiple locations. Such locations may be local or remote.

The techniques described herein may be implemented in software or hardware, or may be implemented using a combination of software and hardware. They may include configuring an apparatus to carry out and/or support any or all of techniques described herein.

The above embodiments are to be understood as illustrative examples. Further embodiments are envisaged.

In examples described above, the first time sample, $t_1$, and the second time sample, $t_0$, are both time samples of the same signal. In other examples, the first time sample, $t_1$, and the second time sample, $t_0$, are time samples of different signals. For example, if the signals are video signals, the second time sample, $t_0$, may correspond to a last frame of a first video and the first time sample, $t_1$, may correspond to a first frame of a subsequent video. As such, a set of spatio-temporal correlation elements may be indicative of an extent of temporal correlation between first reference data based on a first rendition of a first time sample of a signal and second reference data based on a rendition of a second time sample of the or another signal.

In examples described above the second time sample, $t_0$, is an earlier time sample than the first time sample, $t_1$. In other examples, the second time sample, $t_0$, is a later time sample than the first time sample, $t_1$.

In some examples, the decoder device 110 receives input data comprising first input data based on a set of correlation elements and second input data based on a rendition of a first time sample of a signal at a relatively low level of quality in a tiered hierarchy having multiple levels of quality. The decoder device 110 obtains a set of residual elements using the set of correlation elements, the set of residual elements being useable to reconstruct a first rendition of the first time sample of the signal at a relatively high level of quality in the tiered hierarchy using a second rendition of the first time sample of the signal at the relatively high level of quality. The second rendition is based on the rendition at the relatively low level of quality. The decoder device 110 reconstructs the first rendition at the relatively high level of quality using the second rendition and the set of residual elements. The set of correlation elements is indicative of at least an extent of spatial correlation between a plurality of residual elements in the set of residual elements. The input data includes data identifying whether the set of correlation elements is indicative of the extent of spatial correlation or whether the set of correlation elements is further indicative of an extent of temporal correlation between first data based on the first rendition and second data based on a rendition of a second, earlier time sample of the signal. In other words, an identifier is included in the input data, which the decoder device 110 uses to identify whether the set of correlation elements is indicative of both spatial and temporal correlation at the residual level, or only spatial correlation (and not temporal correlation) at the residual level.

In examples described above, quantisation is performed on the set of spatial correlation elements and the set of $\Delta_r$ correlation elements prior to comparing the two sets. In other examples, quantisation is performed after the comparison. In other words, output data may be generated by performing a quantisation operation on the derived set of spatial correlation elements or the derived set of $\Delta_r$ correlation elements. Performing quantisation after the set of spatial correlation elements and the derived set of $\Delta_r$ correlation elements have been compared may facilitate a reduction in errors and/or lost information compared with a case in which quantisation is performed before the comparison.

In examples described above, a set of residual elements is obtained, the set of residual elements being useable to reconstruct a first rendition of a first time sample of a signal at a relatively high level of quality in a tiered hierarchy having multiple levels of quality using a second rendition of the first time sample of the signal at the relatively high level of quality, the second rendition being based on a rendition of the first time sample of the signal at a relatively low level of quality in the tiered hierarchy. In other examples, a set of residual elements is obtained, the set of residual elements being useable to reconstruct a rendition of a first time sample of a signal using a rendition of a second, for example earlier, time sample of the signal. In such examples, the set of residual elements is not obtained by downsampling or upsampling the rendition of the first time sample of the signal.

In examples described above, the data processing apparatus 402 obtains a first set of spatial correlation elements indicative of an extent of spatial correlation between a first set of residual elements associated with a first time sample of a signal, obtains a second set of spatial correlation elements indicative of an extent of spatial correlation between a second set of residual elements associated with a second time sample of the signal, and generates a set of spatio-temporal correlation elements indicative of an extent of temporal correlation between the first set of spatial correlation elements and the second set of spatial correlation elements. As such, a determination of spatial correlation precedes a determination of temporal correlation. In other examples, the data processing apparatus 402 obtains a first set of residual elements associated with the first time sample of the signal and a second set of residual elements associated with the second time sample of the signal, generates a set of temporal correlation elements indicative of an extent of temporal correlation between the first set of residual elements and the second set of residual elements, and generates a set of spatio-temporal correlation elements indicative of an extent of spatial correlation between correlation elements in the set of temporal correlation elements. In such examples, a determination of temporal correlation precedes a determination of spatial correlation.

Various measures (for example apparatuses, methods and computer programs) are provided in which a set of residual elements is obtained. The set of residual elements is useable to reconstruct a first rendition of a first time sample of a signal using a second rendition of the first time sample of the signal. The first rendition is at a relatively high level of quality in a tiered hierarchy having multiple levels of quality. The second rendition is at the relatively high level of quality. The second rendition is based on a rendition of the first time sample of the signal at a relatively low level of quality in the tiered hierarchy. A set of spatio-temporal correlation elements are generated. The set of spatio-temporal correlation elements are associated with the first time sample of the signal. The set of spatio-temporal correlation elements are indicative of an extent of spatial correlation between a plurality of residual elements in the set of residual elements. The set of spatio-temporal correlation elements are indicative of an extent of temporal correlation between first reference data based on the first rendition and second reference data based on a rendition of a second time sample of the signal. The set of spatio-temporal correlation elements are used to generate first output data. The rendition at the relatively low level of quality is used to generate second output data.

In examples described above, the first reference data is at the relatively high level of quality.

In examples described above, the second reference data is at the relatively high level of quality.

In examples described above, the second time sample of the signal is an earlier time sample of the signal relative to the first time sample of the signal.

In examples described above, a first set of spatial correlation elements is generated. The first set of spatial correlation elements are associated with the first time sample of the signal. The first set of spatial correlation elements are indicative of the extent of spatial correlation between the plurality of residual elements in the set of residual elements.

In examples described above, the set of spatio-temporal correlation elements is used to select either the set of spatio-temporal correlation elements or the first set of spatial correlation elements for inclusion in the first output data.

In examples described above, the first reference data comprises the first set of spatial correlation elements.

In examples described above, the second reference data comprises a second set of spatial correlation elements associated with the second time sample of the signal. The second set of spatial correlation elements may be indicative of an extent of spatial correlation between a plurality of residual elements in a further set of residual elements associated with the second time sample. The further set of residual elements may be useable to reconstruct a rendition of the second time sample of the signal at the relatively high level of quality using data based on a rendition of the second time sample of the signal at the relatively low level of quality.

In examples described above, the first reference data comprises the first rendition of the first time sample of the signal.

In examples described above, the second reference data comprises a reconstructed rendition of the second time sample of the signal at the relatively high level of quality.

In examples described above, the selecting is performed by comparing the set of spatio-temporal correlation elements with the first set of spatial correlation elements.

In examples described above, the selecting is performed based on a rate-distortion analysis conducted in relation to the set of spatio-temporal correlation elements and the first set of spatial correlation elements.

In examples described above, the first output data includes data indicative of a result of the selection.

In examples described above, the data indicative of the result of the selection is included in a bit sequence associated with a given data element in the first output data. The given data element may be indicative of an extent of horizontal correlation between a plurality of residual elements in the set of residual elements.

In examples described above, the set of spatio-temporal correlation elements and the first set of spatial correlation elements are quantised.

In examples described above, first buffer data is retrieved from a buffer. The second reference data is obtained based on the first buffer data.

In examples described above, second buffer data is generated using the set of spatio-temporal correlation elements. The buffer is updated by overwriting the first buffer data with the second buffer data.

In examples described above, the second buffer data is generated by combining the set of spatio-temporal correlation elements with the first buffer data.

In examples described above, the buffer is updated by overwriting the first buffer data with second buffer data comprising at least one zero value.

In examples described above, the second rendition is derived by performing an upsampling operation on the rendition at the relatively low level of quality.

In examples described above, the rendition of the first time sample of the signal at the relatively low level of quality is derived by performing a downsampling operation on the first rendition.

In examples described above, the signal is a video signal.

In examples described above, the first output data and the second output data are output for transmission to at least one other apparatus via one or more data communication networks.

Various measures (for example apparatuses, methods and computer programs) are provided in which input data comprising first input data and second input data is received. The first input data is based on a set of correlation elements. The second input data is based on a rendition of a first time sample of a signal at a relatively low level of quality in a tiered hierarchy having multiple levels of quality. A set of residual elements is obtained using the set of correlation elements. The set of residual elements is useable to reconstruct a first rendition of the first time sample of the signal at a relatively high level of quality in the tiered hierarchy using a second rendition of the first time sample of the signal at the relatively high level of quality. The second rendition is based on the rendition at the relatively low level of quality. The first rendition at the relatively high level of quality is reconstructed using the second rendition and the set of residual elements. The set of correlation elements is indicative of at least an extent of spatial correlation between a plurality of residual elements in the set of residual elements. The input data includes data identifying whether the set of correlation elements is indicative of the extent of spatial correlation or whether the set of correlation elements is further indicative of an extent of temporal correlation between first reference data based on the first rendition and second reference data based on a rendition of a second time sample of the signal.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. An apparatus configured to:
    obtain a set of residual elements, the set of residual elements being useable to reconstruct a first rendition of a first time sample of a signal at a relatively high level of quality in a tiered hierarchy having multiple levels of quality using a second rendition of the first time sample of the signal at the relatively high level of quality, the second rendition being based on a rendition of the first time sample of the signal at a relatively low level of quality in the tiered hierarchy;
    generate a set of spatio-temporal correlation elements associated with the first time sample of the signal, the set of spatio-temporal correlation elements being indicative of an extent of spatial correlation between a plurality of residual elements in the set of residual elements and an extent of temporal correlation between first reference data based on the first rendition and second reference data based on a rendition of a second time sample of the signal; and
    use the set of spatio-temporal correlation elements to generate first output data,
    wherein the rendition at the relatively low level of quality is used to generate second output data, and
    wherein the apparatus is configured to generate a first set of spatial correlation elements associated with the first time sample of the signal, the first set of spatial correlation elements being indicative of the extent of spatial correlation between the plurality of residual elements in the set of residual elements.

2. An apparatus according to claim 1, wherein the second reference data is derived from a second set of spatial correlation elements associated with the second time sample of the signal, the second set of spatial correlation elements being indicative of an extent of spatial correlation between a plurality of residual elements in a further set of residual elements associated with the second time sample, the further set of residual elements being usable to reconstruct a rendition of the second time sample of the signal at the relatively high level of quality using data based on a rendition of the second time sample of the signal at the relatively low level of quality.

3. An apparatus according to claim 1, the apparatus comprising a buffer, the apparatus being configured to:
    retrieve first buffer data from the buffer; and
    obtain the second reference data based on the first buffer data.

4. An apparatus according to claim 3, the apparatus being configured to:
    generate second buffer data using the set of spatio-temporal correlation elements; and
    update the buffer by overwriting the first buffer data with the second buffer data.

5. An apparatus according to claim 4, the apparatus being configured to generate the second buffer data by combining the set of spatio-temporal correlation elements with the first buffer data.

6. An apparatus according to claim 3, the apparatus being configured to update the buffer by overwriting the first buffer data with second buffer data comprising at least one zero value.

7. An apparatus according to claim 1, wherein the rendition of the first time sample of the signal at the relatively low level of quality is derived by performing a downsampling operation on the first rendition and wherein the second rendition is derived by performing an upsampling operation on the rendition at the relatively low level of quality.

8. An apparatus configured to:
    receive input data comprising first input data based on a set of spatio-temporal correlation elements and second input data based on a rendition of a first time sample of a signal at a relatively low level of quality in a tiered hierarchy having multiple levels of quality;

obtain a set of residual elements using the set of spatio-temporal correlation elements, the set of residual elements being useable to reconstruct a first rendition of the first time sample of the signal at a relatively high level of quality in the tiered hierarchy using a second rendition of the first time sample of the signal at the relatively high level of quality, the second rendition being based on the rendition at the relatively low level of quality; and reconstruct the first rendition at the relatively high level of quality using the second rendition and the set of residual elements, wherein the set of spatio-temporal correlation elements are indicative of an extent of spatial correlation between a plurality of residual elements in the set of residual elements and an extent of temporal correlation between first reference data based on the first rendition and second reference data based on a rendition of a second time sample of the signal, wherein the first reference data is derived from a first set of spatial correlation elements associated with the first time sample of the signal, the first set of spatial correlation elements being indicative of the extent of spatial correlation between the plurality of residual elements in the set of residual elements.

9. An apparatus according to claim 8, wherein the second reference data is derived from a second set of spatial correlation elements associated with the second time sample of the signal, the second set of spatial correlation elements being indicative of an extent of spatial correlation between a plurality of residual elements in a further set of residual elements associated with the second time sample, the further set of residual elements being usable to reconstruct the rendition of the second time sample of the signal at the relatively high level of quality using data based on a rendition of the second time sample of the signal at the relatively low level of quality.

10. An apparatus according to claim 8, the apparatus comprising a buffer, the apparatus being configured to:
retrieve first buffer data from the buffer; and
reconstruct the first rendition using the first buffer data.

11. An apparatus according to claim 10, wherein the first buffer data is derived from the second reference data.

12. An apparatus according to claim 10, the apparatus being configured to:
generate second buffer data using the set of spatio-temporal correlation elements; and
update the buffer by overwriting the first buffer data with the second buffer data.

13. An apparatus according to claim 12, the apparatus being configured to generate the second buffer data by combining the set of spatio-temporal correlation elements with the first buffer data.

14. An apparatus according to claim 8, wherein the second rendition is derived by performing an upsampling operation on the rendition at the relatively low level of quality.

15. A method comprising:
obtaining a set of residual elements, the set of residual elements being useable to reconstruct a first rendition of a first time sample of a signal at a relatively high level of quality in a tiered hierarchy having multiple levels of quality using a second rendition of the first time sample of the signal at the relatively high level of quality, the second rendition being based on a rendition of the first time sample of the signal at a relatively low level of quality in the tiered hierarchy;

generating a set of spatio-temporal correlation elements associated with the first time sample of the signal, the set of spatio-temporal correlation elements being indicative of an extent of spatial correlation between a plurality of residual elements in the set of residual elements and an extent of temporal correlation between first reference data based on the first rendition and second reference data based on a rendition of a second time sample of the signal, wherein generating the set of spatio-temporal correlation elements includes
generating a first set of spatial correlation elements associated with the first time sample of the signal, the first set of spatial correlation elements being indicative of the extent of spatial correlation between the plurality of residual elements in the set of residual elements, and
using the set of spatio-temporal correlation elements to generate first output data,
wherein the rendition at the relatively low level of quality is used to generate second output data.

16. A method according to claim 15, wherein the second reference data is derived from a second set of spatial correlation elements associated with the second time sample of the signal, the second set of spatial correlation elements being indicative of an extent of spatial correlation between a plurality of residual elements in a further set of residual elements associated with the second time sample, the further set of residual elements being usable to reconstruct a rendition of the second time sample of the signal at the relatively high level of quality using data based on a rendition of the second time sample of the signal at the relatively low level of quality.

17. A method according to claim 15, wherein the rendition of the first time sample of the signal at the relatively low level of quality is derived by performing a downsampling operation on the first rendition and wherein the second rendition is derived by performing an upsampling operation on the rendition at the relatively low level of quality.

18. A method comprising:
receiving input data comprising first input data based on a set of spatio-temporal correlation elements and second input data based on a rendition of a first time sample of a signal at a relatively low level of quality in a tiered hierarchy having multiple levels of quality;

obtaining a set of residual elements using the set of spatio-temporal correlation elements, the set of residual elements being useable to reconstruct a first rendition of the first time sample of the signal at a relatively high level of quality in the tiered hierarchy using a second rendition of the first time sample of the signal at the relatively high level of quality, the second rendition being based on the rendition at the relatively low level of quality; and reconstructing the first rendition at the relatively high level of quality using the second rendition and the set of residual elements, wherein the set of spatio-temporal correlation elements are indicative of an extent of spatial correlation between a plurality of residual elements in the set of residual elements and an extent of temporal correlation between first reference data based on the first rendition and second reference data based on a rendition of a second time sample of the signal, and wherein the first reference data is derived from a first set of spatial correlation elements associated with the first time sample of the signal, the first set of spatial correlation elements being indicative of the extent of spatial correlation between the plurality of residual elements in the set of residual elements.

19. A method according to claim 18, wherein the second reference data is derived from a second set of spatial correlation elements associated with the second time sample of the signal, the second set of spatial correlation elements being indicative of an extent of spatial correlation between a plurality of residual elements in a further set of residual elements associated with the second time sample, and wherein the further set of residual elements is usable to reconstruct the rendition of the second time sample of the signal at the relatively high level of quality using data based on a rendition of the second time sample of the signal at the relatively low level of quality.

20. A method according to claim 18, wherein the second rendition is derived by performing an upsampling operation on the rendition at the relatively low level of quality.

* * * * *